US012485761B2

(12) United States Patent
Kamiya et al.

(10) Patent No.: US 12,485,761 B2
(45) Date of Patent: Dec. 2, 2025

(54) VEHICLE DISPLAY SYSTEM, VEHICLE DISPLAY METHOD, AND STORAGE MEDIUM

(71) Applicant: DENSO CORPORATION, Kariya (JP)

(72) Inventors: Akira Kamiya, Kariya (JP); Kiyotaka Taguchi, Kariya (JP); Yasuhiko Joho, Kariya (JP); Toshinori Mizuno, Kariya (JP); Hiroyuki Mimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 18/509,086

(22) Filed: Nov. 14, 2023

(65) Prior Publication Data

US 2024/0083252 A1 Mar. 14, 2024

Related U.S. Application Data

(63) Continuation of application No. PCT/JP2022/019339, filed on Apr. 28, 2022.

(30) Foreign Application Priority Data

May 19, 2021 (JP) ................................. 2021-084649

(51) Int. Cl.
*B60K 35/00* (2024.01)
*B60K 35/10* (2024.01)
(Continued)

(52) U.S. Cl.
CPC .............. *B60K 35/81* (2024.01); *B60K 35/10* (2024.01); *B60K 35/22* (2024.01); *B60K 35/265* (2024.01);
(Continued)

(58) Field of Classification Search
CPC ........ B60K 35/00; B60K 35/10; B60K 35/29; B60K 35/65; B60K 35/81;
(Continued)

(56) References Cited

U.S. PATENT DOCUMENTS

2011/0109526 A1 5/2011 Bauza et al.
2020/0167116 A1* 5/2020 Manabe ............... B60K 35/656

FOREIGN PATENT DOCUMENTS

JP 2011244465 A 12/2011
JP 2017187758 A 10/2017
(Continued)

*Primary Examiner* — Yuen Wong
(74) *Attorney, Agent, or Firm* — Harness, Dickey & Pierce, P.L.C.

(57) ABSTRACT

A vehicle display system, by executing a computer-readable program, being configured to: display multiple image contents in separate display areas of a display device arranged in a vehicle; detect a visual field range of an occupant of the vehicle; determine whether a frame rate of a certain image content displayed in the visual field range satisfies a lowest reference, the certain image content being one of the multiple image contents; and in response to determining that the frame rate of the certain image content does not satisfy the lowest reference, reduce a processing load of a different process while maintaining a display process of the certain image content in the visual field range of the occupant.

15 Claims, 16 Drawing Sheets

(51) Int. Cl.
  *B60K 35/22* (2024.01)
  *B60K 35/26* (2024.01)
  *B60K 35/28* (2024.01)
  *B60K 35/29* (2024.01)
  *B60K 35/81* (2024.01)
  *B60K 35/65* (2024.01)

(52) U.S. Cl.
  CPC .............. *B60K 35/28* (2024.01); *B60K 35/29* (2024.01); *B60K 35/65* (2024.01); *B60K 2360/149* (2024.01); *B60K 2360/182* (2024.01); *B60K 2360/1868* (2024.01); *B60K 2360/741* (2024.01)

(58) Field of Classification Search
  CPC ........ B60K 2360/149; B60K 2360/182; B60K 2360/1868; B60K 2360/741; B60K 35/265; B60K 2360/176; B60K 35/28; B60K 35/22; B60R 11/02; G06F 3/14; G09G 5/00; G09G 5/02; G09G 5/18; G09G 5/36; G09G 5/377
  See application file for complete search history.

(56) References Cited

FOREIGN PATENT DOCUMENTS

| | | |
|---|---|---|
| JP | 2019132968 A | 8/2019 |
| JP | 2020086829 A | 6/2020 |
| JP | 2021024402 A | 2/2021 |

* cited by examiner

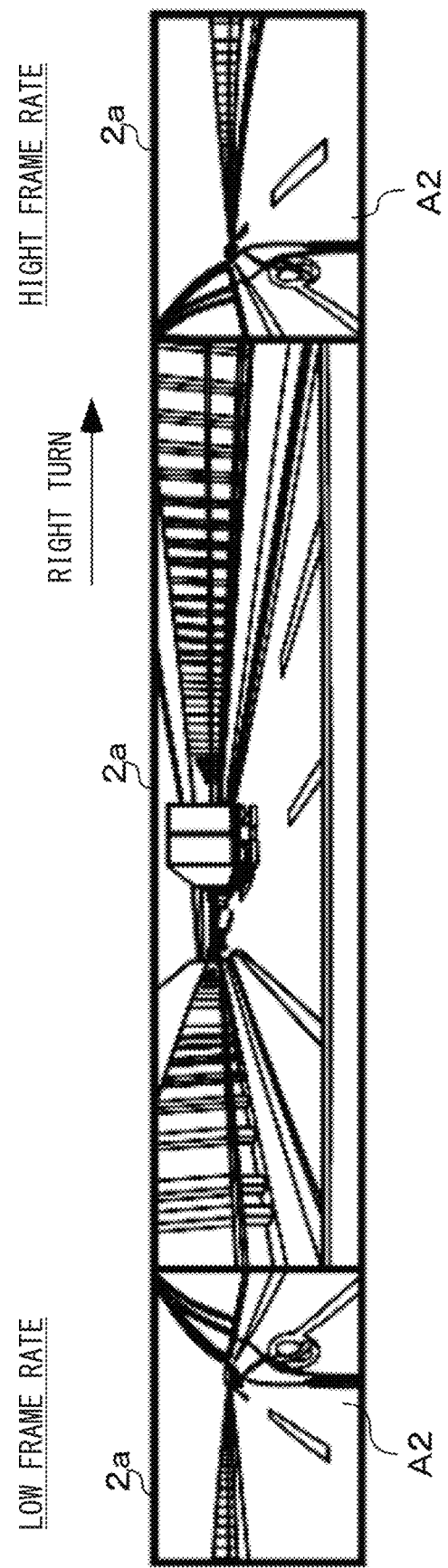

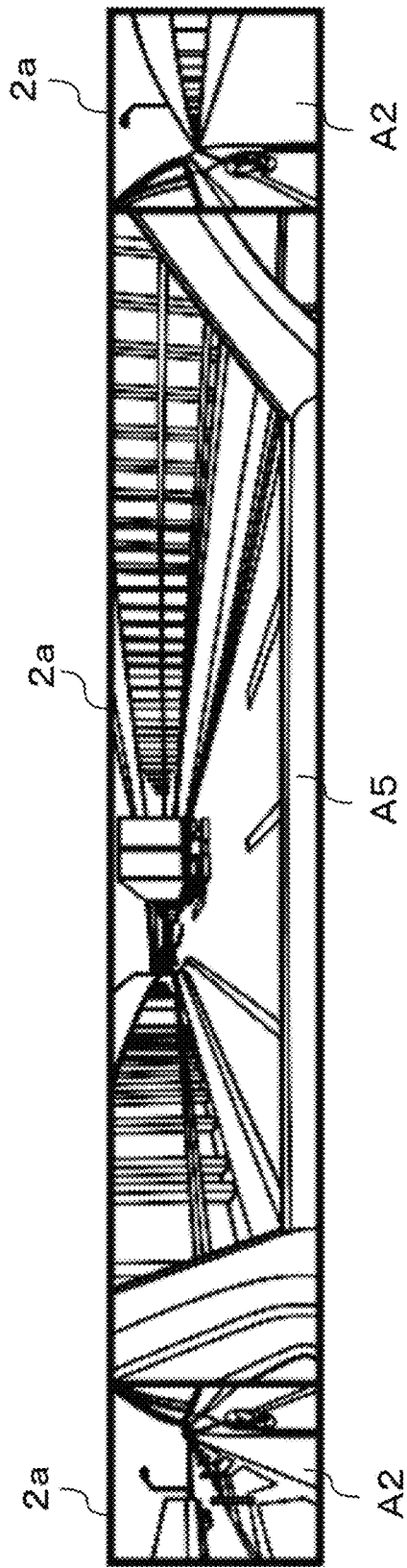

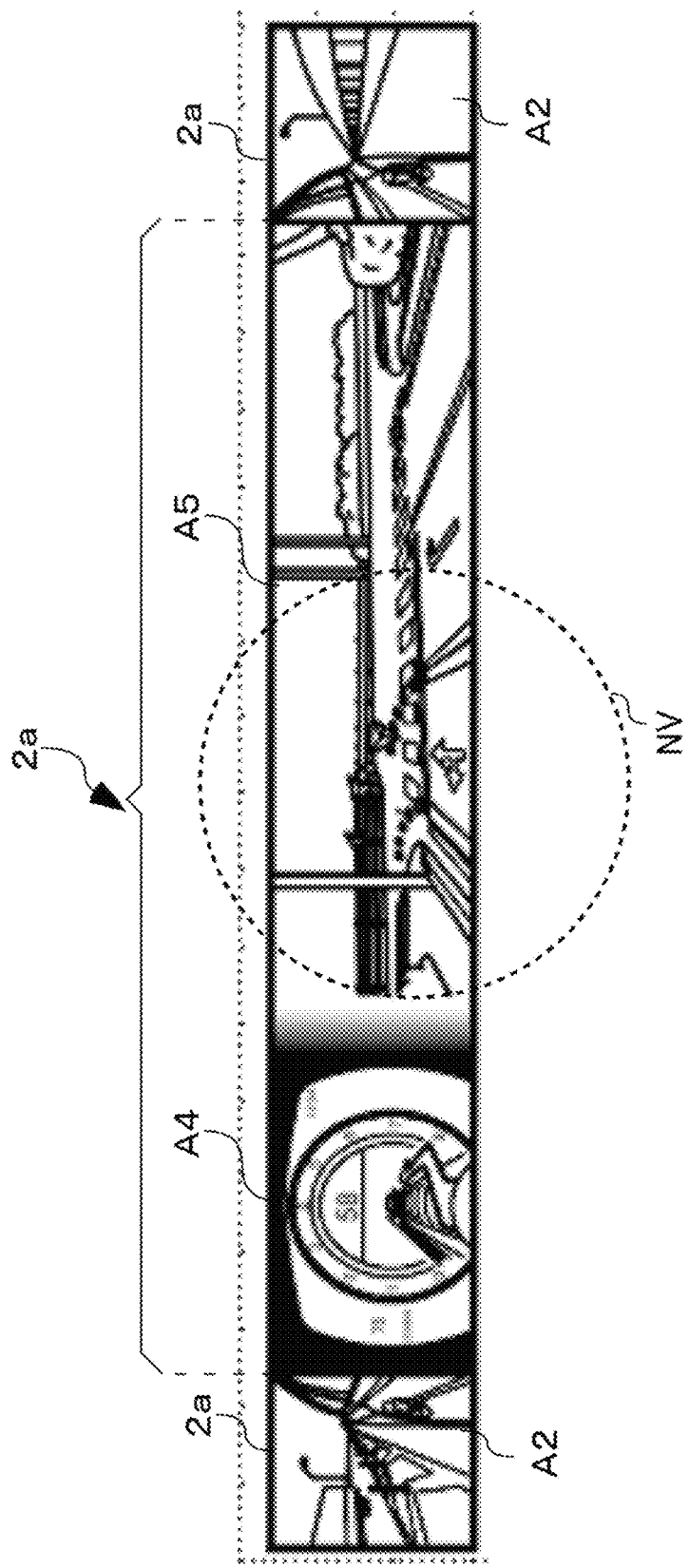

VEHICLE DISPLAY SYSTEM, VEHICLE DISPLAY METHOD, AND STORAGE MEDIUM

CROSS REFERENCE TO RELATED APPLICATIONS

The present application is a continuation application of International Patent Application No. PCT/JP2022/019339 filed on Apr. 28, 2022, which designated the U.S. and claims the benefit of priority from Japanese Patent Application No. 2021-084649 filed on May 19, 2021. The entire disclosures of all of the above applications are incorporated herein by reference.

TECHNICAL FIELD

The present disclosure relates to a vehicle display system, a vehicle display method, and a storage medium.

BACKGROUND

There has been known a cockpit system in which multiple displays, such as a meter display, a center display, and a head-up display are arranged in a vehicle cabin.

SUMMARY

The present disclosure provides a vehicle display system, by executing a computer-readable program, being configured to: display multiple image contents in separate display areas of a display device arranged in a vehicle; detect a visual field range of an occupant of the vehicle; determine whether a frame rate of a certain image content displayed in the visual field range satisfies a lowest reference, the certain image content being one of the multiple image contents; and in response to determining that the frame rate of the certain image content does not satisfy the lowest reference, reduce a processing load of a different process while maintaining a display process of the certain image content in the visual field range of the occupant.

BRIEF DESCRIPTION OF DRAWINGS

Objects, features, and advantages of the present disclosure will become apparent from the following detailed description made with reference to the accompanying drawings. In the drawings:

FIG. 8 is a diagram showing a fourth example of display mode;

FIG. 10 is a diagram showing a sixth example of display mode;

FIG. 11 is a diagram showing a seventh example of display mode;

DETAILED DESCRIPTION

Figure 1A:
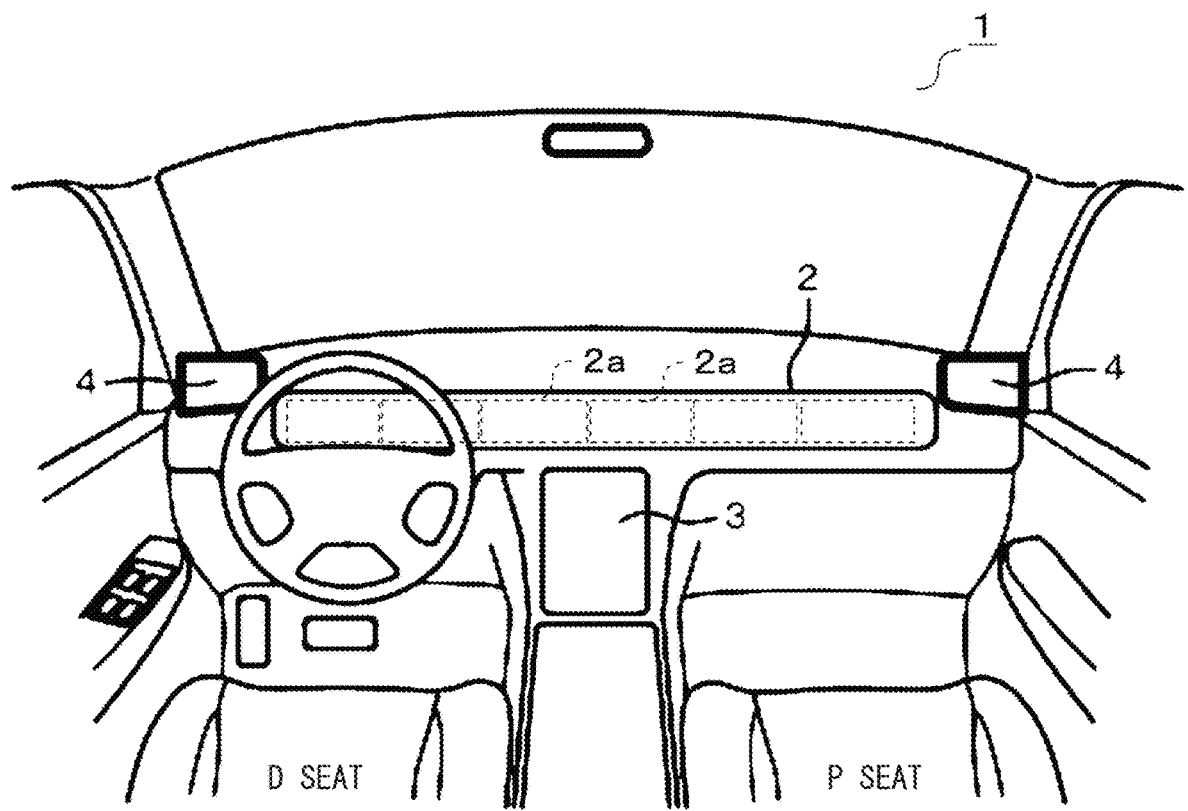
FIG. 1A is a diagram showing an external view configuration of a cockpit system according to a first embodiment.

Conventionally, in a cockpit system, multiple displays such as a meter display, a center display, and a head-up display are disposed in a vehicle cabin, and an ECU executes drawing process in each of the displays. In recent years, it has been desired to increase a size of an in-vehicle display installed in a vehicle. However, since cost for providing multiple middle-sized displays is lower than a cost for providing a single large-sized display, a technology of constructing a large-sized display with multiple middle-sized displays has been provided.

Since each processor for display purpose has a limited processing capability, the image processing loads of multiple image contents drawn on the respective middle-sized displays are different from one another. When multiple image contents are simultaneously displayed on respective middle-sized displays, a duration from signal input to image display in each display may be different from one another. When a large display is configured by combining multiple displays, an amount of display output data is large, and it is difficult to update all of the data at the same frame rate. Thus, display processing may be performed on each display at a predetermined frame rate different from one another for the corresponding image content, such as 60 frames per second (fps) in an electronic mirror for a captured image and 10 fps in an around view monitor for a monitoring image.

When content requiring a high processing load is displayed, the frame rate may decrease. When the processing load increases significantly, the content cannot be drawn at a required display speed and noise is superimposed on the display content. In the worst case, the content cannot be displayed, and an occupant who views the image content may feel uncomfortable for no display.

According to a related art, a degree of visual line focusing on a display area of display device and a degree of visual line not focusing on the display area of display device are distinguished and specified. When a viewing level is within the degree of visual line not focusing on the display area, a frame rate of the image displayed on the corresponding display device is decreased to be lower than that when the viewing level is within the degree of visual line focusing on the display area of display device. When the visual line is not directed to a certain display, the frame rate of the certain display is set to be lower than that when the visual line is directed to the certain display.

In a case where display areas for multiple image contents are divided in a single large display and the image contents are drawn at different frame rates from one another, a difference may occur between motions of image contents displayed on multiple display areas. Therefore, an occupant who checks the image contents may feel uncomfortable for the displayed image contents.

According to an aspect of the present disclosure, a vehicle display system includes: a display processing unit displaying multiple image contents in separate display areas of a display device arranged in a vehicle; a visual field detecting unit detecting a visual field range of an occupant of the vehicle; a reference determining unit determining whether a frame rate of a certain image content displayed in the visual field range satisfies a lowest reference, the certain image content being one of the multiple image contents; and a processing load changing unit, in response to determining that the frame rate of the certain image content does not satisfy the lowest reference, reducing a processing load of a different process while maintaining a display process of the certain image content in the visual field range of the occupant.

In the above configuration, when the reference determining unit determines that the image content does not satisfy the lowest reference, the processing load changing unit changes processing load of a different process from the display process for displaying the image content within the visual field range. Thus, it is possible to preferentially allocate resource to the display process for displaying the image content within the visual field range of the occupant. Thus, when multiple image contents are displayed in separate display areas of the display device, the image contents can be displayed without causing the occupant, who views the image contents, to feel uncomfortable.

The following will describe embodiments of a vehicle display system 1 with reference to the accompanying drawings. In the following description of each embodiment, the same reference symbol is assigned to the substantially same elements.

First Embodiment

As shown in FIG. 1A, the vehicle display system 1 includes a cockpit system, which includes multiple displays, such as a pillar-to-pillar display device 2, a center display device 3, and an electronic mirror 4. However, the number, an installation structure, and a configuration of multiple display devices are merely examples, and the present disclosure is not limited thereto. Hereinafter, the pillar-to-pillar display device 2 is also referred to as a P to P display device 2.

Figure 1B:
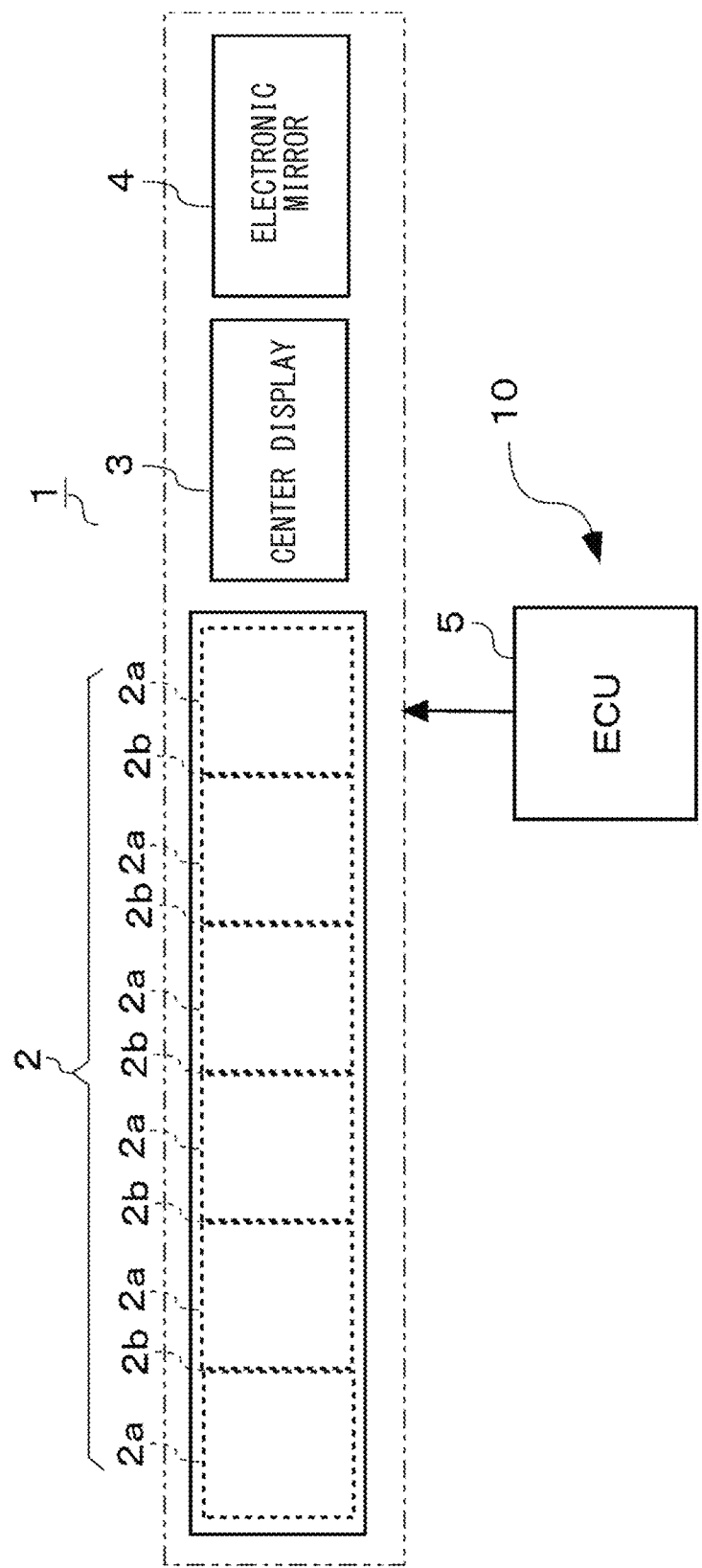
FIG. 1B is a diagram showing a control mode executed by an ECU.

As shown in FIG. 1A and FIG. 1B, the P to P display device 2 includes multiple displays 2a arranged side by side in a horizontally direction. Each display 2a of the P to P display device 2 is provided by a liquid crystal display or an organic EL display. As shown in FIG. 1A, the P to P display device 2 is a large display device arranged on a dashboard between a left pillar and a right pillar of a vehicle. The P to P display device 2 is capable of displaying, in a full graphic display, various image contents such as a map image A3 around a current position, a meter image A4, an image A5 captured by a periphery camera 23, and a static or moving entertainment image content A6.

The center display device 3 may be provided by a liquid crystal display or an organic EL display. As shown in FIG. 1A, the center display device may be installed below the P to P display device 2 between a driver seat and a passenger seat. The center display device 3 is arranged in the vicinity of a center console such that the center display device can be easily viewed by both a driver and a passenger in a front passenger seat. The center display device 3 is capable of displaying various contents in a full graphic display. An operation panel 21 is arranged on the center display device 3, and receives various input operations for selecting contents to be displayed on the P to P display device 2, operating air conditioning, operating audio device, and operating a navigation function.

The P to P display device 2 and the center display device 3 are arranged in up to down direction of the vehicle, and are spaced apart from one another. When two screens are installed in the up to down direction, it is possible to increase a display area that can be visually recognized by the occupant at one time. The expression of visually recognize may be also referred to as an expression of view. In the cockpit system, a display screen of each display 2a of the P to P display device 2 is installed so as to be positioned farther from an occupant in outward direction than a display screen of the center display device 3. Here, the outward direction means that the display screen of the P to P display device 2 is positioned close to a vehicle exterior with respect to the vehicle occupant, such as the driver. That is, in a traveling direction of the vehicle, the display screen of the P to P display device 2 is in front of that of the center display device 3. Each display 2a of the P to P display device 2 has a black band-shaped outer frame 2b, and the frame 2b is arranged so as to surround the display screen of each display 2a.

The electronic mirror 4 includes one or more displays 4a and one or more door mirror cameras 4b. Each display 4a of the electronic mirror 4 may be provided by a liquid crystal display or an organic EL display. The displays 4a may be arranged at lower positions of A-pillars in the vehicle compartment on left and right sides of the driver. The door mirror camera 4b is provided by a periphery camera 23 that captures an image of a rear side, that is, a side rear side of the own vehicle from an installation location of the door mirror. The display 4a of the electronic mirror 4 is arranged at a position such that the driver can easily check the rear side of the vehicle. The display 4a is capable of displaying periphery information of the vehicle captured by the door mirror camera 4b.

Figure 2:
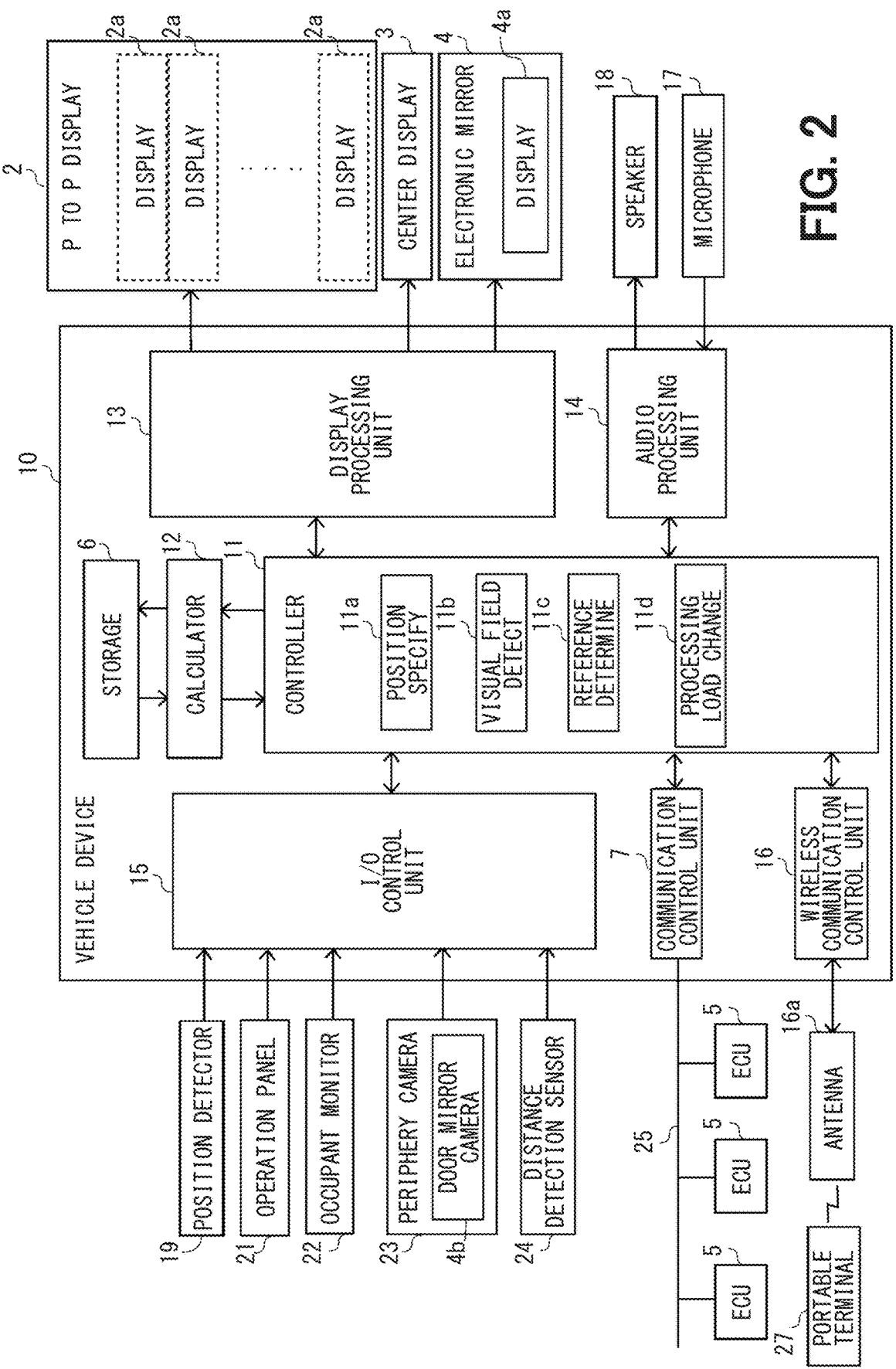
FIG. 2 is a diagram showing an electrical configuration of a vehicle display system.

As shown in FIG. 1B and FIG. 2, multiple ECUs 5 are mounted on the vehicle and connected to an in-vehicle network 25. The multiple ECUs 5 include a display system ECU, a periphery monitoring system ECU, a travel control system ECU, and a data communication module (DCM) for communicating with outside of the vehicle. The travel control system ECU includes well-known vehicle control ECUs, such as an engine control ECU, a motor control ECU, a brake control ECU, a steering control ECU, an integrated control ECU, and the like. When the travel control system ECU receives an autonomous control signal, the travel control system ECU functions as an autonomous driving ECU that executes a corresponding driving assist at a predetermined level or executes an autonomous driving at a predetermined level. The autonomous driving ECU is an Autonomous Driving Electric Control Unit.

When the autonomous driving ECU receives the autonomous control signal, the autonomous driving ECU executes the driving assist or autonomous driving at a corresponding automated level by controlling a driving actuator. For example, the driving assistance of level I includes an automated braking operation to avoid collisions with obstacles, a follow-up driving operation to follow a preceding vehicle, or a lane departure prevention driving operation that controls the vehicle so that it does not depart from the lanes on both sides. The automated driving of level II can execute the driving assistance of level I, and can further execute an automated driving mode that controls the vehicle to perform automated driving under specific conditions. For example, under level II, the automated driving can control the vehicle to automatically pass over a slow vehicle on an expressway, or control the vehicle to automatically merge onto or come out the road at a branch point in the expressway. The driver is obliged to monitor the autonomous driving in level II. In the autonomous driving of level III or higher, the system performs all driving tasks by performing monitoring with the system itself. The detailed description will be omitted.

Each ECU 5 is mainly configured by a microcomputer, which includes a processor, various storages 6, such as a cache memory, a RAM, and a ROM, an I/O interface, and a bus connecting these components. Each ECU 5 is communicably connected to other ECUs 5 mounted on the vehicle through a communication control unit 7 and the in-vehicle network 25.

In the present embodiment, as shown in FIG. 2, one display system ECU 5 constitutes an HCU as the vehicle device 10. The display system ECU 5 shares a processing capacity of its internal resources to perform display processing on each display device 2, 3, and 4a. The HCU is an abbreviation for human machine interface control unit. The storage 6 is a non-transitory tangible storage medium for storing, in non-transitory manner, computer readable programs and data. The non-transitory tangible storage medium may be implemented by a semiconductor memory or the like.

As shown in FIG. 2, the vehicle device 10 includes a controller 11, a calculator 12, the storage 6, a display processing unit 13, an audio processing unit 14, an I/O control unit 15 that manages input or output from various components, a communication control unit 7 that manages a communication with another ECU 5, and a wireless communication control unit 16 that is connected with an antenna 16a to enable a wireless connection with another portable terminal 27 by a wireless LAN or Bluetooth (registered trademark). As shown in FIG. 2, output signals from main components, such as a position detector 19, an operation panel 21, an occupant monitor 22, a periphery camera 23, and a distance detection sensor 24 are input to the vehicle device 10 via an I/O control unit 15, and the following description will be based on this configuration example. However, the signals may be input to the vehicle device from other ECUs 5, such as a periphery monitoring system ECU or a travel control system ECU via the in-vehicle network 25.

The calculator 12 calculates display areas to be displayed on the display screens of the P to P display device 2, the center display device 3, and the display 4a of the electronic mirror 4 for displaying image contents, sentences, characters, comments, or symbols (hereinafter, referred to as image or the like) stored in the storage 6, by the control executed by the controller 11. The calculator 12 calculates a display target area of the image or the like among the display areas on the display screens of the P to P display device 2, the center display device 3, or the display 4a of the electronic mirror 4. The calculator 12 calculates further calculates in which area the image or the like is to be displayed in superimposed manner, and then outputs the display contents of image or the like to the display processing unit 13 through the controller 11.

Under the control of the controller 11, the display processing unit 13 displays contents such as image or the like in the above-described display areas on the display screens of the P to P display device 2, the center display device 3, and the electronic mirror 4. Images or the like may be displayed on the display screens of the display devices 2, 3, and 4a for each display layer.

Under the control of the controller 11, the audio processing unit 14 receives an audio signal input from the microphone 17 and outputs an audio signal via the speaker 18. When the contents of sentence and character are input from the controller 11, the audio processing unit 14 may convert the text contents into an audio signal by reading the inputted contents, and output the audio signal via speaker 18. The audio processing unit 14 may detect whether the driver has uttered or the occupant in the front passenger seat has uttered based on an audio signal input from the microphone 17, and outputs the detected audio signal to the controller 11.

The position detector 19 detects a position with high accuracy using a well-known GNSS receiver such as GPS (not shown), an inertial sensor such as an acceleration sensor or a gyro sensor. The position detector 19 outputs a position detection signal to the controller 11 through the I/O control unit 15. The controller 11 includes a position specifying unit 11a may function as an ADAS locator that sequentially measures a current position of the vehicle with high accuracy based on the map information input from the map data input device and the position detection signal detected by the position detector 19. The ADAS is an abbreviation for advanced driver assistance systems.

The vehicle position is represented in a coordinate system defined by latitude and longitude. In this coordinate system, x-axis may indicate longitude and y-axis may indicate latitude It should be noted that the specifying of vehicle position may be executed in various manners in addition to the above-described method. For example, the position of the vehicle may be specified based on travelling distance information obtained from the detection result by a vehicle speed sensor mounted on the subject vehicle. The controller 11 can perform a well-known navigation process, that is, route navigation process based on the current position of the subject vehicle.

The operation panel 21 may be provided by a touch panel arranged on the center display device 3. The I/O control unit 15 receives an operation made by the occupant on the operation panel, and outputs the inputted operation to the controller 11. The controller 11 executes a control based on the operation signal input from the operation panel 21.

The occupant monitor 22 detects a state of the occupant in the vehicle or an operation state made by the occupant. The occupant monitor 22 may be configured by a power switch, an occupant state monitor, a turn switch, an autonomous control switch, and the like. The occupant monitor outputs various signals to the controller 11. The occupant monitor 22 may include a steering sensor that detects whether the steering wheel is being gripped or steered by the driver, a seating sensor that detects whether the driver is seated, an accelerator pedal or brake pedal depression sensor, and the like.

The power switch is turned on by a user in the vehicle compartment in order to start an internal combustion engine or an electric motor of the vehicle. The power switch outputs a signal corresponding to the user operation. The occupant state monitor includes a camera that detects a state of the occupant in the driver seat or the passenger seat by capturing a state of the occupant with an image sensor and outputs an image signal. The occupant state monitor of the driver is referred to as DSM. The DSM is an abbreviation for driver status monitor.

The occupant state monitor obtains an image signal obtained by irradiating the face of the driver with near-infrared light and capturing an image, analyzes the image as necessary, and outputs the signal to the controller 11. The occupant state monitor detects the state of the occupant, such as the driver, especially during the driving assistance or the autonomous driving being executed. The turn switch is turned on by an occupant in the vehicle compartment to activate a direction indicator of the subject vehicle, and outputs a turn signal indicating a right turn or a left turn corresponding to the operation made by the occupant.

When the autonomous control switch is turned on by the occupant in the vehicle compartment, an autonomous control signal corresponding to the operation of the occupant is output in order to command predetermined driving assist or autonomous driving control for the traveling state of the vehicle. The automatic control signal is output to the travel control system ECU in order to perform driving assistance at a corresponding predetermined level or perform autonomous driving control at a corresponding predetermined level.

The controller 11 can determine a behavior of the occupant of the vehicle, for example, in which direction the visual line is directed, based on the sensor signal from the occupant monitor 22. The controller 11 may also receive the operation state of the power switch, the operation state of the direction indicator, the command information of the autonomous control of the vehicle, sensor information detected by various sensors, and operation information.

The periphery camera 23 may include a front view camera that captures front views images of the vehicle, a rearview camera that captures rear view images of the vehicle, a corner camera that captures images of front lateral side and rear lateral side of the vehicle, a lateral side camera that captures images of lateral side of the vehicle, the door mirror camera 4b of the electronic mirror 4, or the like. The captured images are transmitted to the controller 11 through the I/O control unit 15 as image signals of a front guide monitor, a back guide monitor, a corner view monitor, a lateral side guide monitor, and the electronic mirror 4, respectively, and then stored in the storage 6. The communication control unit 7 is connected to the in-vehicle network 25 such as controller area network (CAN) or local interconnect network (LIN), and controls data communication with other ECUs 5.

The distance detection sensor 24 detects a distance to an obstacle, and is mounted on the vehicle as a periphery monitoring sensor. The distance detection sensor 24 may include a clearance sonar, a LiDAR (light detection and ranging), a millimeter wave radar, or the like. The distance detection sensor detects a distance to a person or to an obstacle, which exists or approaches the subject vehicle from a front portion of the vehicle, a front corner portion of the vehicle, a rear portion of the vehicle, a rear corner portion of the vehicle, or a lateral side portion of the vehicle. The obstacle may be another vehicle existing around the subject vehicle.

Figure 3:
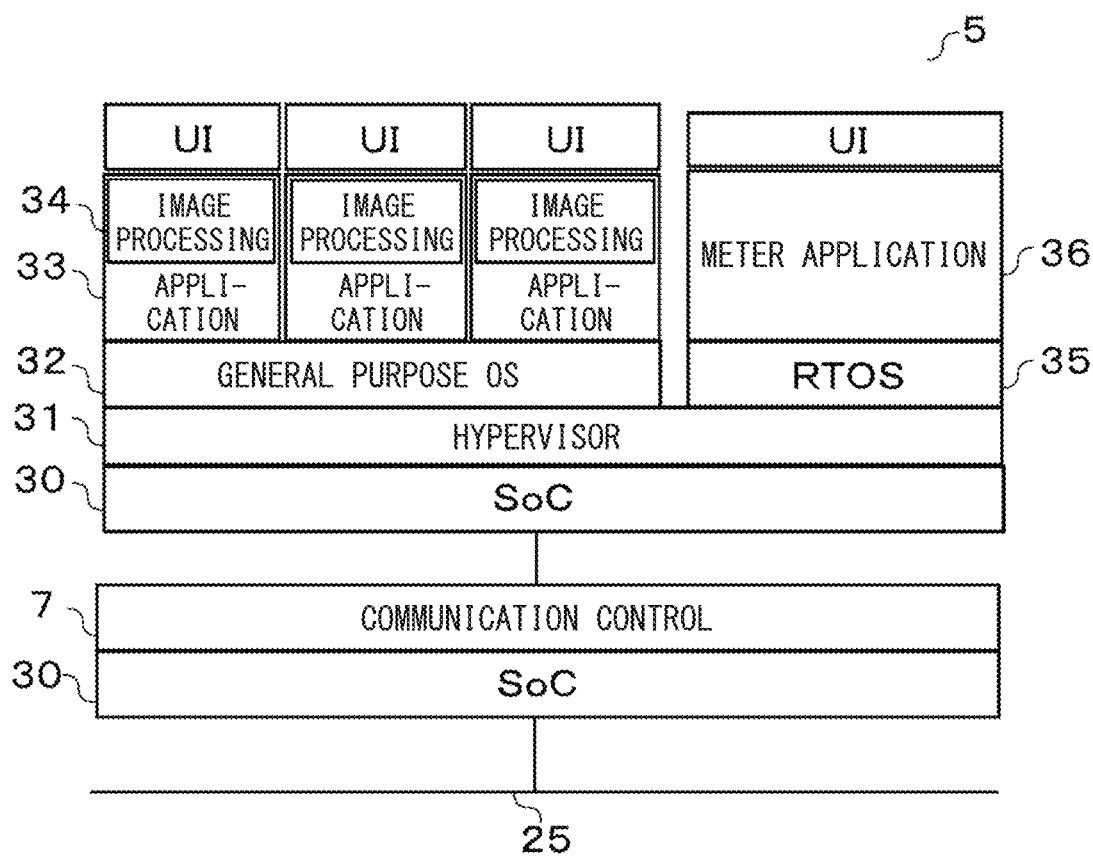
FIG. 3 is a diagram showing hardware and software configuration.

FIG. 3 shows an example of hardware and software configuration of the vehicle device 10. Each ECU 5 includes an SoC 30, and the SoC 30 is embedded with the microcomputer described above. The SoC is an abbreviation for system on chip. In the microcomputer embedded in the SoC 30 of the ECU 5, a general purpose operation system (OS) 32, for example, a Linux OS (Linux is a registered trademark) or a real time OS (RTOS) 35 is implemented on a hypervisor 31.

On the general purpose OS 32, various applications 33 are installed to operate on the general purpose OS 32. The applications 33 include an image processing application 34 and other applications. A processor equipped in the SoC 30 executes a drawing process on the display screen of each display 2a of the P to P display device 2 in response to a drawing request from the image processing application 34.

The real time OS 35 is capable of executing process that requires higher real time performance than the general purpose OS 32, and executes a meter application 36. The following description may focus on the applications 33, such as the image processing application 34 and the meter application 36.

The meter application 36 notifies the user of the vehicle speed, the rotation speed, warnings, and the like. The meter application mainly outputs an image content to be displayed in a display area of a specific display 2a in the P to P display device 2. For example, the meter application 36 generates and draws image content, such as a speedometer V, a tachometer T, a shift position, or a warning light. The speedometer V includes a speed image which requires real time update to indicate a change in the vehicle speed. Similarly, the tachometer T is also included in the meter image A4 because the display needs to be updated in real time to indicate a change in the rotation speed.

Although the meter application 36 is operated on the real time OS 35, the meter application 36 may also be operated on the general purpose OS 32. By the meter application 36, as will be described later, the speedometer V for displaying the traveling speed in analog manner by performing a drawing indicating a needle H and the tachometer T for displaying the engine speed in analog manner by similarly performing a drawing indicating a needle H are displayed on the display 2a. In addition, a digital speedometer and a digital tachometer for performing a digital display D for vehicle speed and engine rotation speed may also be drawn on the display 2a. A content drawn by the meter application 36 can also be displayed on another display, for example, on the center display device 3.

The applications 33 include a navigation application and the like. The navigation application implements a navigation function and mainly shows image contents, such as a map image A3 and a navigation image including the current position of the vehicle to be displayed on the P to P display device 2. The applications 33 include an image generation application. The image generation application generates one or more image contents to be displayed on each display 2a of the P to P display device 2.

The applications 33 include an image synthesizing application. The image synthesizing application specifies sizes and types of various image contents to be displayed on the P to P display device 2, synthesizes the image contents in one frame, and outputs the synthesized mixed image on the displays 2a of the P to P display device 2. The image synthesizing application includes a function as an image composition unit also referred to as a compositor.

Among the applications 33 and 36, a display layer for drawing the image content is assigned to the application that draws the image content. These display layers are secured in the storage 6 in a size capable of drawing necessary image contents.

The image contents to be displayed on the display devices 2, 3 may perform animation operation. Here, the animation operation is a display mode in which a position and a size of an image content gradually change, the image content rotates, the entire area of user interface moves in response to a swipe operation, the image gradually fades in or fades out, the color of the image changes, or the like.

As shown in FIG. 2, the controller 11 of the vehicle device 10 includes, as function blocks, a position specifying unit 11a, a visual field detecting unit 11b, a reference determining unit 11c, and a processing load changing unit 11d. These function blocks are implemented by execution of the application 33. The position specifying unit 11a specifies the current position of the vehicle based on the position detection signal from the position detector 19. The above-described applications include a navigation application. The navigation application executes a navigation function, and mainly draws a navigation image to be displayed on the P to P display device 2. The navigation image includes the map image A3, the current position of the vehicle specified by the position specifying unit 11a, or the like.

The visual field detecting unit 11b detects a visual field range NV of an occupant, such as the driver or the occupant in the front passenger seat by using the occupant state monitor of the occupant monitor 22. The reference determining unit 11c determines whether or not the frame rate of the image content satisfies the lowest reference when the image content is displayed in the visual field range NV. When the lowest reference is not satisfied, the processing load changing unit 11d reduces a processing load other than the processing load of the display processing unit 13 for displaying the image content in the visual field range NV. Other processing loads may be a processing load for audio output, a processing load for displaying image content outside the visual field range of the occupant, or the like.

The following will describe an operation of the above-described configuration. The vehicle device 10 shares the physical resources of the ECU 5 and performs drawing processing on each display 2a of the P to P display device 2, the center display device 3, and each display 4a of the electronic mirror 4. At this time, when there is a difference in drawing data generation speed due to execution of image processing, image conversion, or the like, the frame rates of image contents displayed on each display 2a may differ from one another when the image content is drawn on one P to P display device 2.

Figure 4:
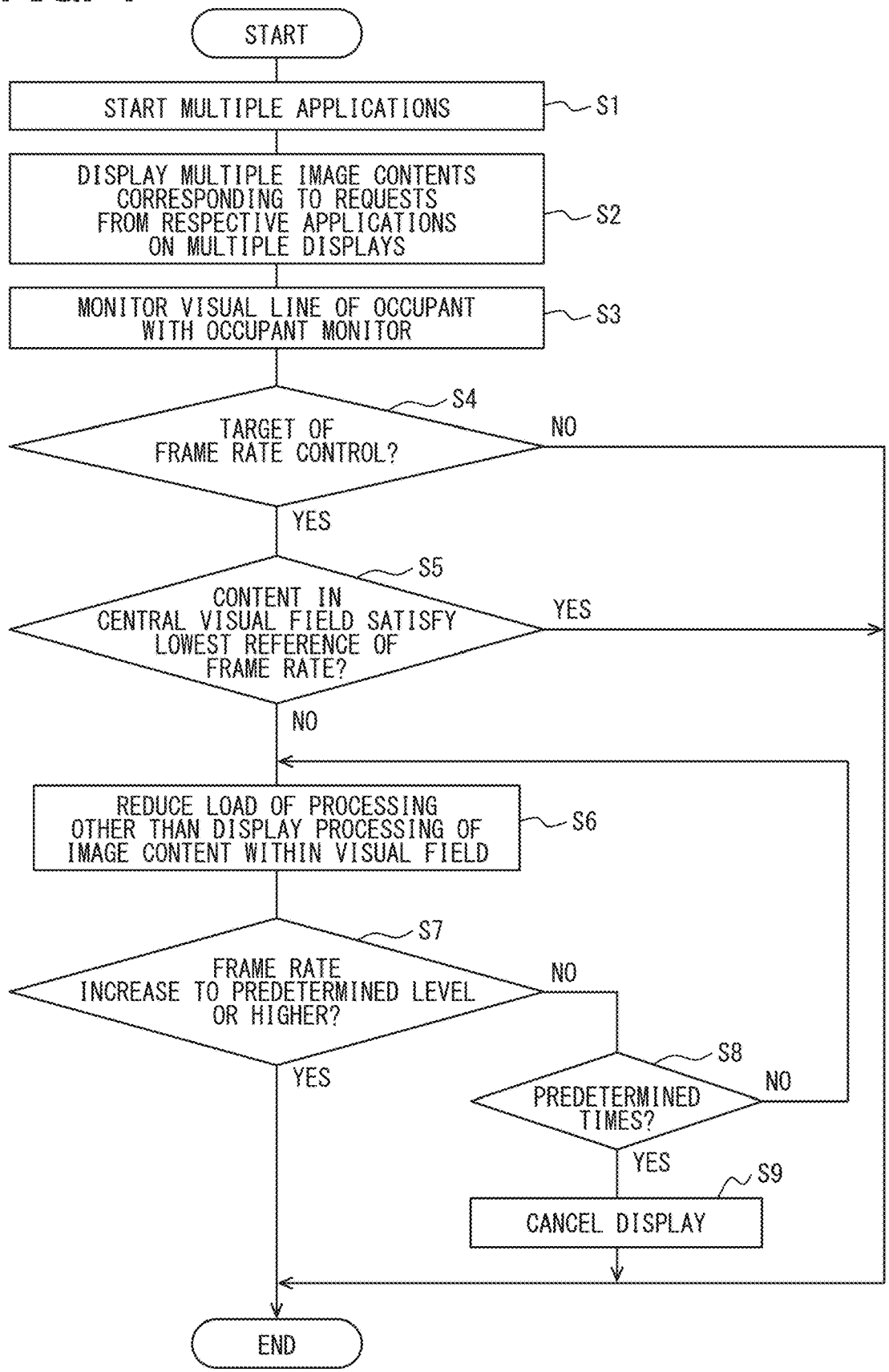
FIG. 4 is a flowchart showing a display process.

When the vehicle device 10 activates the application 33 and draws the image content on each display 2a, the vehicle device may perform the drawing process as shown in a flowchart of FIG. 4.

When the vehicle device 10 is activated by turning on the power switch, the vehicle device 10 activates multiple applications 33 in 51. The vehicle device 10 generates an image content to be displayed on each display 2a based on a request from the applications 33. In S2, the display processing unit 13 displays the image contents corresponding to the execution of the respective applications 33 on the screens of respective displays 2a. In S3, the vehicle device 10 monitors the visual line of the occupant of the vehicle, such as the driver, by the occupant monitor 22. Then, the controller 11 detects the visual field range NV of the occupant by the visual field detecting unit 11b.

In S4, the controller 11 determines whether the image content included in the visual field range NV of the occupant is a target of frame rate control. The target of frame rate control refers to an image content whose frame rate is to be controlled. The image content determined as the target of frame rate control changes in various ways based on the situation in the vehicle and the situation around the vehicle. Specific examples will be described later. When the controller determines, in S4, that the image content is not the target of frame rate control, the controller 11 determines NO in S4 and ends the process.

When the controller 11 determines in S4 that the image content is the target of frame rate control, the controller 11 determines YES in S4, and the reference determining unit 11c determines, in S5, whether the image content existing in the central visual field range NV satisfies the lowest reference of the frame rate.

In S5, when the frame rate is determined to satisfy the lowest reference, the process is ended. In S5, when the frame rate is determined to not satisfy the lowest reference, the process determines NO in S5 and proceeds to S6.

In S6, the controller 11 reduces a processing load other than the processing of displaying the image content in the visual field range NV of the occupant. For example, the controller 11 may reduce a processing load of audio output processing executed by the audio processing unit 14 or a processing load of displaying image content on the other displays 2a, 3, and 4a. For example, the processing load may be reduced by intentionally reducing the frame rate of the image content displayed on other displays 2a, 3, and 4a. Details will be described later.

The controller 11 can preferentially allocate resource to the processing for displaying the image content in the visual field range NV, and can increase the frame rate of image content while the image content being displayed. Thus, the image content can be displayed with improved user experience when the user views the displayed image content.

The controller 11 repeats the processing of S6 until the frame rate of the image content in the visual field range NV of the occupant increases to a predetermined level or higher as shown in S7. In S7, when the frame rate fails to increase to the predetermined level or higher even though the controller 11 reduces another processing load in S6 by a predetermined number of times determined in advance, the display processing unit 13 proceeds to S9 and cancels the display processing. Accordingly, it is possible to avoid display of image content that does not satisfy the lowest reference.

According to the present embodiment, when the frame rate of the image content viewed by the occupant does not satisfy the lowest reference, the controller 11 continues the display processing of the image content while reducing another processing load. Thus, it is possible to display the image content being viewed by the occupant with improved user experience.

The following will describe a method of reducing another processing load different from the display processing of image content viewed by the occupant. For example, the processing load changing unit 11d may decrease the frame rate of image content displayed outside the visual field range NV of the occupant. At this time, the frame rate of image content displayed inside the visual field range NV detected by the visual field detecting unit 11b may be maintained or increased.

Figure 5:
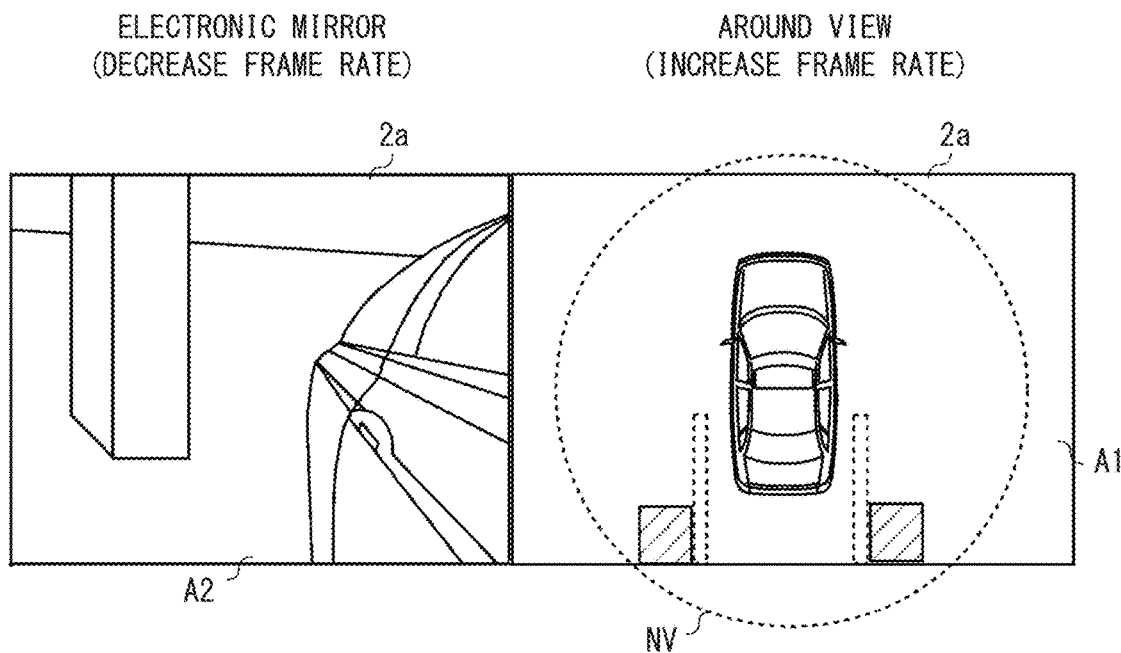
FIG. 5 is diagram showing a first example of display mode.

As shown in FIG. 5, the display processing unit 13 may display an image of around view A1 on one display 2a of the P to P display device 2 and display the captured image A2 of door mirror camera 4b of the electronic mirror 4 on another display 2a of the P to P display device 2. Hereinafter, the captured image A2 of the door mirror camera 4b is referred to as an electronic mirror image A2.

For example, when the visual field detecting unit 11b detects that the driver is viewing the image content of around view A1, the controller 11 may reduce the processing load by decreasing frame rate of the electronic mirror image A2 displayed on another display 2a. By this configuration, the visual line of driver can be focused on the central portion of visual field range NV. Thus, even if the processing of image content displayed outside the visual field range NV of the driver is out of synchronization, it is possible to prevent the driver from being aware of the decrease in the frame rate.

Figure 6:
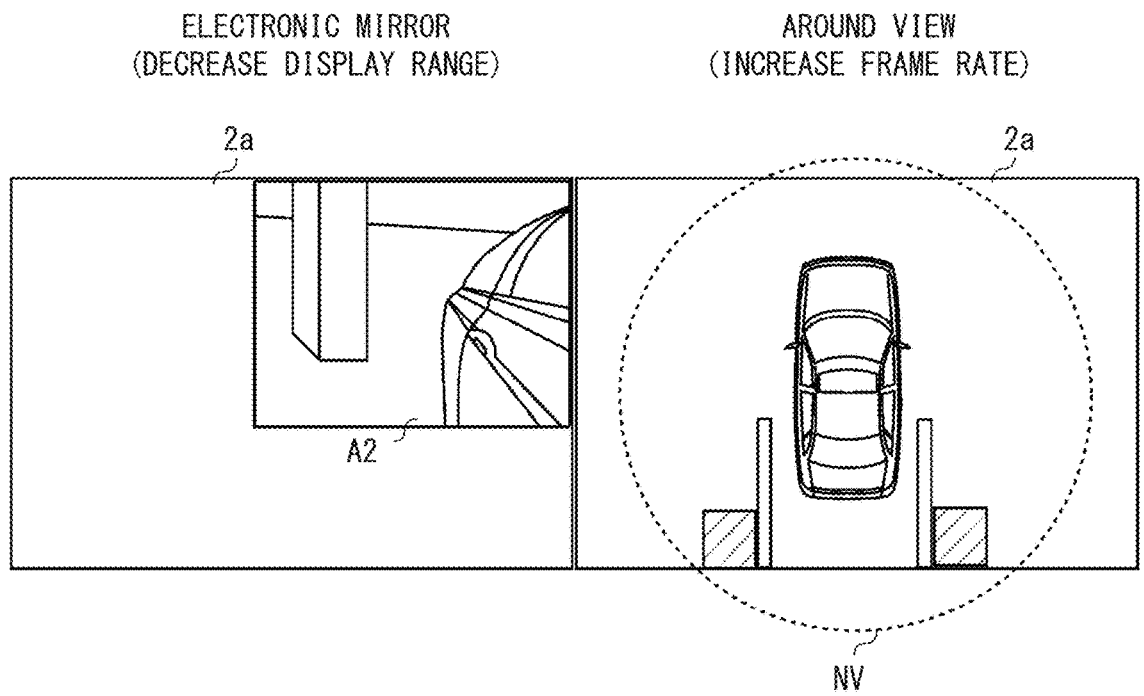
FIG. 6 is diagram showing a second example of display mode.

The controller 11 may control the visual field detecting unit 11b to detect the visual field when a certain display 2a is viewed by the occupant, and controls the processing load changing unit 11d to reduce the display size of another image content within the screen of corresponding display 2a outside the visual field range NV by displaying partial region of the image content as shown in FIG. 6. In this manner, the controller 11 can reduce the processing load. The processing load may be reduced by intentionally reducing the frame rate of the electron mirror image A2. At this time, a size of the image content displayed in the detected visual field range NV may be maintained or increased.

The processing load changing unit 11d may reduce the processing load of display processing unit 13 by reducing a resolution, the number of colors, or a gradation of display screen of the display 2a outside the visual field range NV. For example, an image content having a resolution of full HD image quality may be converted into an image content having a lower resolution, an image content having full colors may be converted into an image content having 256 colors, or an image content having 256 gradations may be converted into an image content having two monochrome gradations.

The processing load changing unit 11d preferentially displays content to be legally presented to the driver of the vehicle at an increased frame rate while reducing other processing loads. That is, presentation of legally necessary information is assigned with higher priority than presentation of other information.

For the content to be legally presented to the driver, the frame rate is maintained at the lowest reference or higher in order to secure visibility when viewed by the occupant. For a content that is not legally required to be presented to the driver, the frame rate is reduced such that the processing load can be reduced.

Figure 7A:
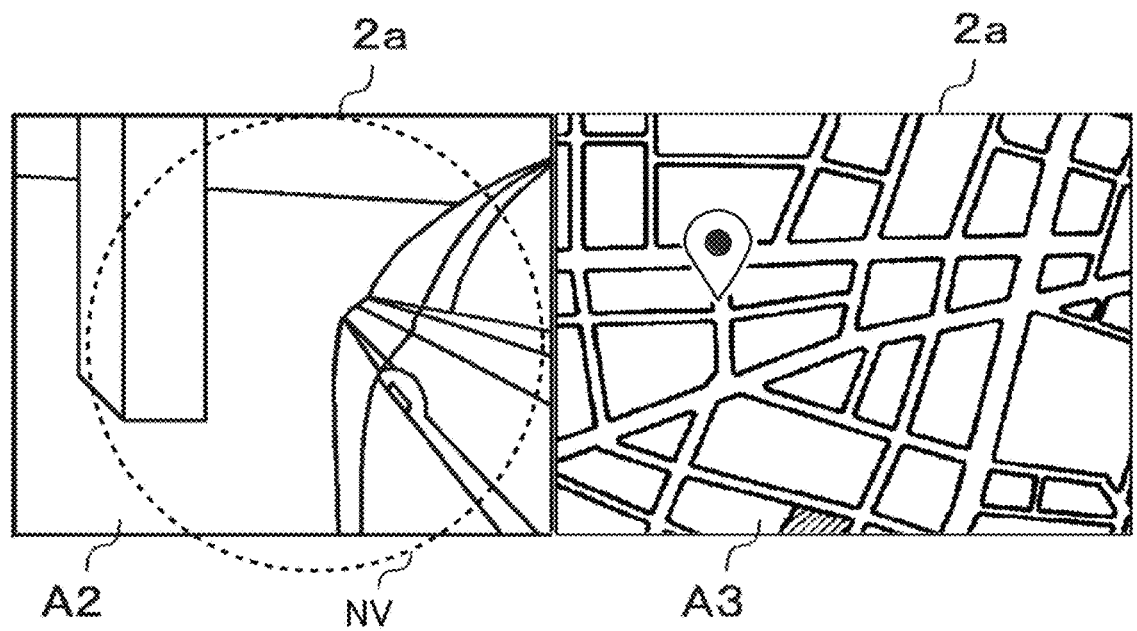
FIG. 7A and FIG. 7B are diagrams showing a third example of display mode.
Figure 7B:
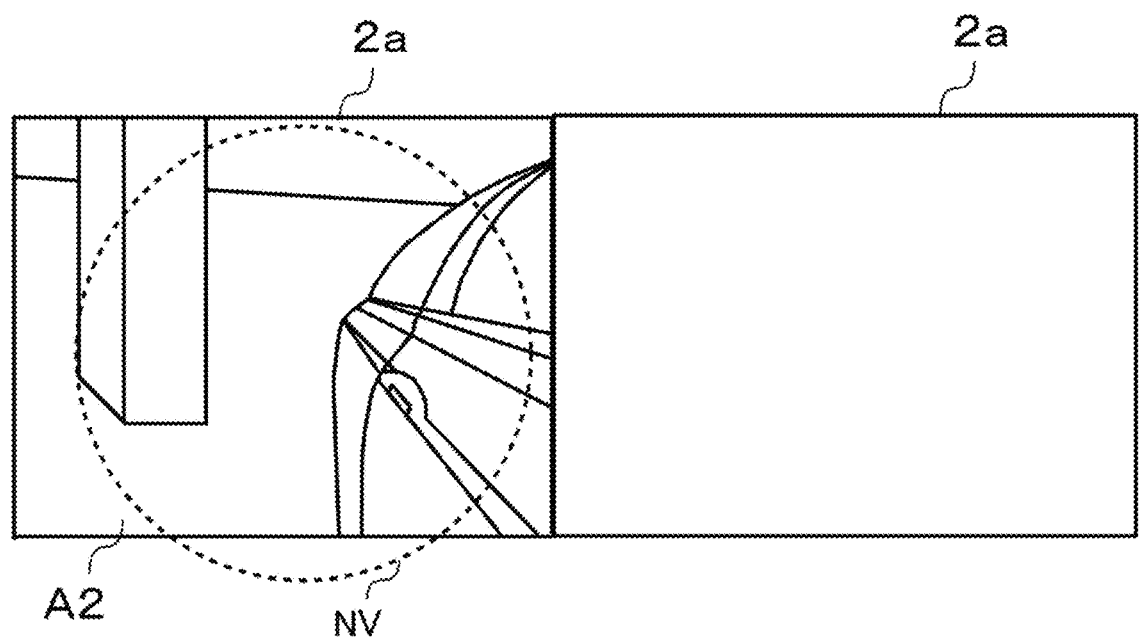

For example, as shown in FIG. 7A, the display processing unit 13 displays the electronic mirror image A2 in one display 2a and displays the map image A3 for navigation guide in another display 2a. When it is determined that a large amount of resource is required to display the electronic mirror image A2, as shown in FIG. 7B, the controller 11 may erases the navigation purpose map image A3 thereby giving priority to the display of electronic mirror image A2. Since the optical mirror and the electronic mirror 4 for checking the rear side are legally indispensable as vehicle equipment, higher priority is given to display of the electronic mirror image A2 than the navigation.

In order to improve visibility, the processing load changing unit 11d preferentially increases the frame rate of content to be legally presented to the driver of the vehicle and displays the legally required content. When the content is not legally required to be presented, the frame rate may be reduced or maintained to reduce the processing load.

The information update frequency of navigation purpose map image A3 may be decreased by increasing the information update interval, or display of the map image A3 may be intentionally cancelled. At this time, the controller 11 may notify the occupant that display of the map image A3 is to be cancelled before cancelling display of the map image A3.

The processing load changing unit 11d may determine a priority order of the contents to be displayed based on information related to driving operation performed by the driver, and reduces the frame rate of image content having a low priority to reduce the processing load. An image content having a high priority may be displayed with the frame rate being maintained or increased. The controller 11 may estimate a driving behavior and a driving scene of the driver based on operation information of the direction indicator, the steering wheel, or the brake pedal by the driver, and determine the image content whose frame rate is to be decreased or increased.

For example, when a steering signal indicating that the steering wheel is turned to the left or right is input or when a turn signal of a direction indicator is input, the controller 11 may determine that rear side confirmation by the driver is necessary. Thus, the controller may increase a priority of display processing of the electronic mirror image A2 corresponding to the direction indicated by the turn signal and decrease the priority of display processing for other image contents. In this way, the processing load in total can be decreased.

For example, in a case where the controller 11 receives a turn signal for right turn, as shown in FIG. 8, the priority of display processing of electronic mirror image A2 for confirming the right rear side may be increased such that the frame rate can be maintained or increased as much as possible. At the same time, the controller may reduce processing load of other processing. Specifically, the priority of display processing of the electronic mirror image A2 on a side opposite to the turning direction may be lowered such that the frame rate can be decreased. Thus, the processing load for displaying other image contents can be decreased.

When the brake operation is detected by the brake depression sensor, the controller 11 may decrease the processing load in total by increasing the priority of display processing of screen content that displays an image captured by the periphery camera 23 corresponding to the rearview mirror while decreasing the priority of display processing of image content on other displays 2a.

The processing load changing unit 11d may determine a priority of display processing for displaying a content corresponding to operation information made on an accessory device by the vehicle occupant, and decrease the frame rate of image content having a low priority while the image content is being displayed. In this way, the processing load can be decreased in total. In this case, the frame rate of image content having a high priority may be maintained or increased. That is, not only the visual field range NV but also the operation information made by the occupant on the operation panel 21 which is an accessory device, is set as one of priority determination criteria for determining the frame rate.

As described above, the operation panel 21 is arranged on the center display device 3, and the occupant may perform a touch or swipe operation on the operation panel 21 while paying attention to the traveling direction of the vehicle. At this time, the occupant pays more attention to the display screen of the center display device 3 operated by the occupant than the peripheral visual field.

When an operation performed on the operation panel 21 is detected, the controller 11 may maintain or increase the frame rate by increasing the priority of display processing of operation screen to be displayed on the center display device 3 and decrease the priority of other processing such that the processing load can be decreased in total. The frame rate of operation screen display on the center display device 3 can be maintained or increased. Thus, even if the occupant is concerned on the center display device 3 compared with peripheral visual field, the occupant can keep the center display device 3 within the visual field of the occupant. Thus, the operation panel 21 can be operated smoothly.

The display processing unit 13 may perform the display processing with a predetermined design that satisfies a requirement for indicating legally necessary information, and display of information that is not necessary for driving or not legally required may be not performed. For example, the display may be performed in a simple mode by omitting excessive decoration. The vehicle speed display on the speedometer V as shown in 9A is legally required. Thus, the tachometer T and the water temperature meter, or the like may not be displayed. In this case, the processing load may be reduced by cancelling display of these legally unnecessary image contents. That is, only the speed display, which is legally required, may be displayed as the meter image A4.

Figure 9A:
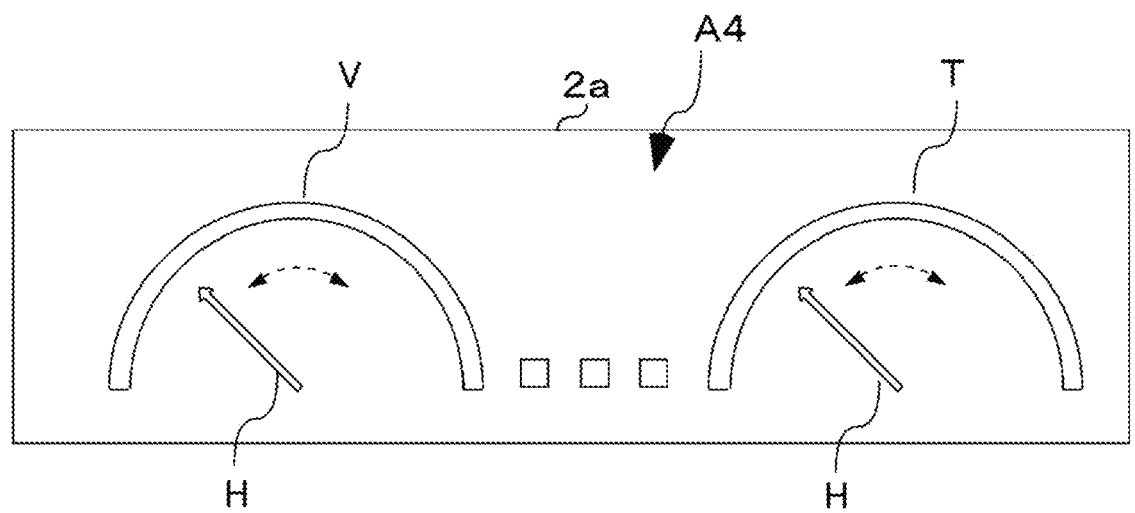
FIG. 9A and FIG. 9B are diagrams showing a fifth example of display mode.
Figure 9B:
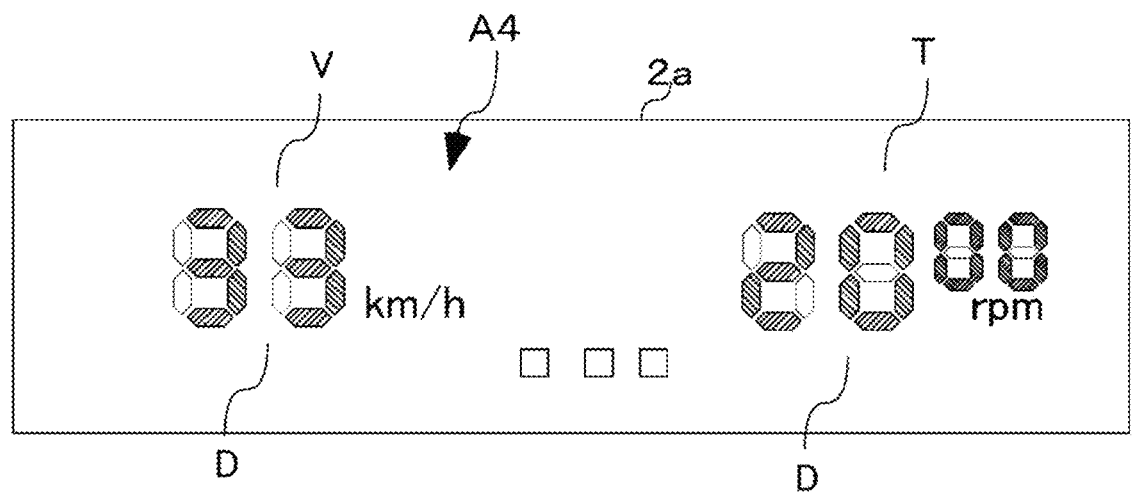

As shown in FIG. 9A, normally, the display processing unit 13 graphically displays the needle H on the display 2a as the speedometer V and the tachometer T of the meter image A4, and graphically displays the needle H so as to be swung to the left or right corresponding to the vehicle speed or engine rotation speed. Instead of displaying the speedometer V and the tachometer T as shown in FIG. 9A, the display processing unit 13 may display the vehicle speed and engine rotation with digital display D as shown in FIG. 9B in order to decrease processing load.

For example, in the digital display D, in order to express three to four digit number corresponding to each digit of the speedometer V and the tachometer T, it is sufficient for the display processing unit 13 to control seven segments by the number of digits. Thus, in the digital display D shown in FIG. 9B, the processing load can be significantly reduced as compared with the case where the image of needle H is graphically displayed on the display 2a as shown in FIG. 9A.

The processing load changing unit 11d may preferentially secure resource to be used for graphic display by the processor of the ECU 5 of the display system, and reduce the processing load related to the audio processing executed by the audio processing unit 14. Since the audio processing load of the audio processing unit 14 is reduced, the remaining resource can be allocated to the graphic display. With this configuration, it is possible to maintain a high frame rate required for graphic display.

The processing load changing unit 11d may change the processing load by changing the frame rate of image content indicating a periphery situation of the vehicle corresponding to actual periphery situation of the own vehicle. For example, when the image A5 captured by the periphery camera 23 is displayed on the display 2a while the own vehicle is traveling in a forest or the like, the display processing unit 13 draws trees, leaves, and the like in detail on the display 2a. Thus, occupant may feel tired or stressed while viewing the image content displaying details of the periphery situation including large amount of stimulation. When the display processing unit 13 determines that the drawing of image content is finer than a predetermined level, the image content may be drawn by increasing a changing speed of frame rate. Thus, it is possible to perform drawing in accordance with a change in the image content, and it is possible to prevent the occupant from feeling uncomfortable for the displayed image content.

As shown in FIG. 10, when the image A5 captured by the periphery camera 23 is displayed on the display 2a while the vehicle is traveling on the expressway, the same image content is drawn for a long duration so that the change in color is small and the stimulus applied to the visual field of occupant is relatively small. Thus, the display processing unit 13 may draw the image content by changing the frame rate more slowly than described above. Thus, the display processing unit 13 can draw the content on the display 2a while reducing the resource being used. The same applies to a case where the image A5 captured by the periphery camera 23 is displayed on the display 2a while the own vehicle is traveling on a snowy road or the like.

When displaying multiple image contents in one display 2a corresponding to requests from multiple applications 33 and 36, the processing load changing unit 11d may set a priority for each application 33, 36 to increase the frame rate. Then, frame rate of each application is changed corresponding to the set priority. In this case, the processing load of display processing in response to a request from an application having low priority may be reduced.

Figure 12:
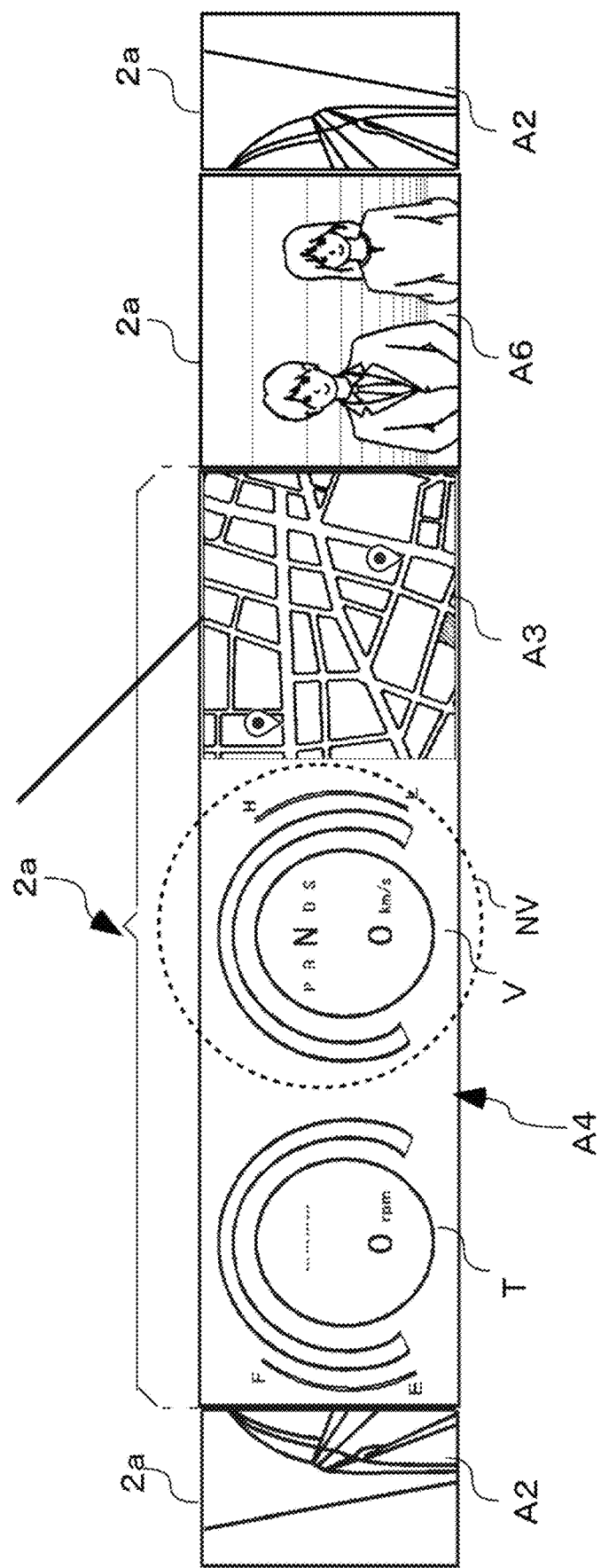
FIG. 12 is a diagram showing an eighth example of display mode.

In a case where the display processing unit 13 displays the meter image A4 and the image A5 captured by the periphery camera 23 in one display 2a in connected manner based on requests from multiple applications 33, 36 as shown in FIG. 11, or in a case where multiple image contents, such as the map image A3 and the meter image A4 are displayed in one display 2a in connected manner based on requests from multiple applications 33, 36 as shown in FIG. 12, a priority to be assigned to each application may be set and the frame rate of image content to be displayed corresponding to the application may be set based on the priority of application.

The lower frame rate may be set to the application 33, 36 which outputs greater number of requests. The higher frame rate may be set to the application 33, 36, which outputs smaller number of requests. For the application 33 displaying image contents on another display 2a, such as electronic mirror image A2, entertainment image content A6, a priority for allocating resource may be set. Then, a new priority order may be determined for this priority order with consideration of above-described priority order, and frame rates of the image contents to be displayed on respective displays 2a may be determined based on the newly set priority order.

When an alarm is generated in the vehicle control, in order to accurately transmit the alarm, a resource may be preferentially allocated to the display process related to the alarm, and the alarm may be displayed with an increased frame rate.

The display processing unit 13 executes display processing on a screen so that the occupant can easily visually recognize the screen based on a detection result of visual line of the occupant detected by the occupant monitor 22. However, when the occupant frequently moves the visual line, the display screen is frequently changed based on the above-described display processing. In this case, it becomes more difficult for the occupant to view the display screen.

The processing load changing unit 11d may measure, using a timer, a stay duration of visual line within the visual field range NV detected by the visual field detecting unit 11b, and set a priority order of the frame rate based on the stay duration of visual line. Then, the frame rate may be changed according to the set priority thereby decreasing the processing load. For example, the frame rate may be maintained when the stay duration of visual line is shorter than a predetermined duration. The frame rate may be increased to be higher than a predetermined level when the stay duration of visual line is equal to or longer than the predetermined duration.

The processing load changing unit 11d may adjust the processing load amount related to the image processing in accordance with the level of driving automation. The load of another processing may be reduced with reference to change of frame rate for the image content displayed in the visual field range NV of the vehicle occupant corresponding to the level of driving automation at which the vehicle is autonomously driven.

Figure 13A:
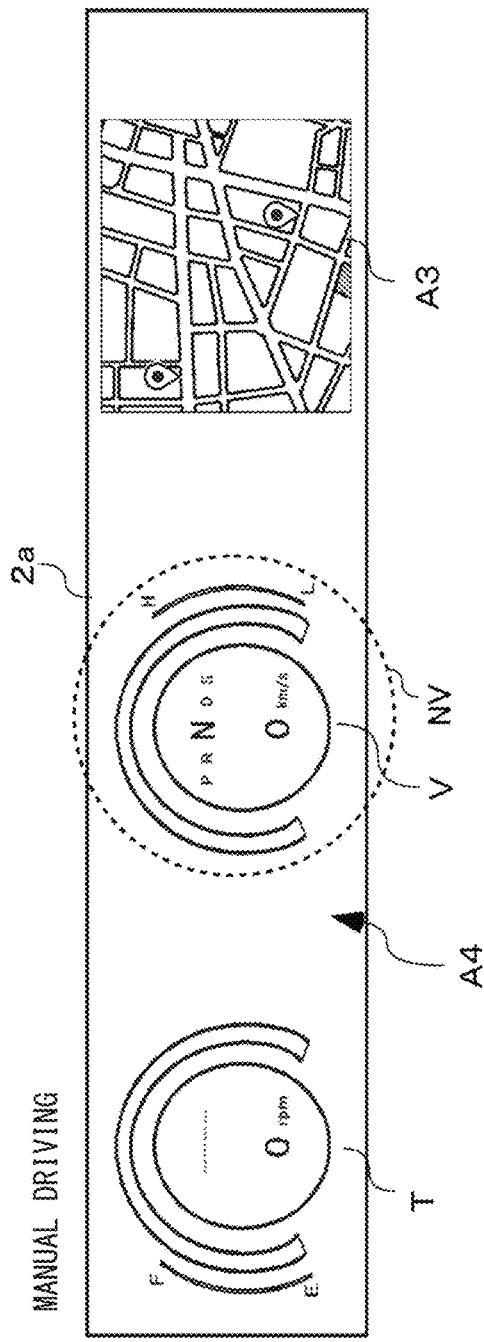
FIG. 13A and FIG. 13B are diagrams showing a ninth example of display mode.

For example, in the case of manual driving, as shown in FIG. 13A, image content for the driver (for example, the meter image A4 and the map image A3) is displayed on the display 2a, thereby providing the driver with information necessary for driving with less distraction. At this time, other processing loads may be reduced while increasing the frame rate of the image content of the display 2a displayed in the visual field range NV. In this case, the processing load may be reduced by decreasing the frame rate of the image content displayed in the visual field of the occupant in the front passenger seat compared with that of driver.

Figure 13B:
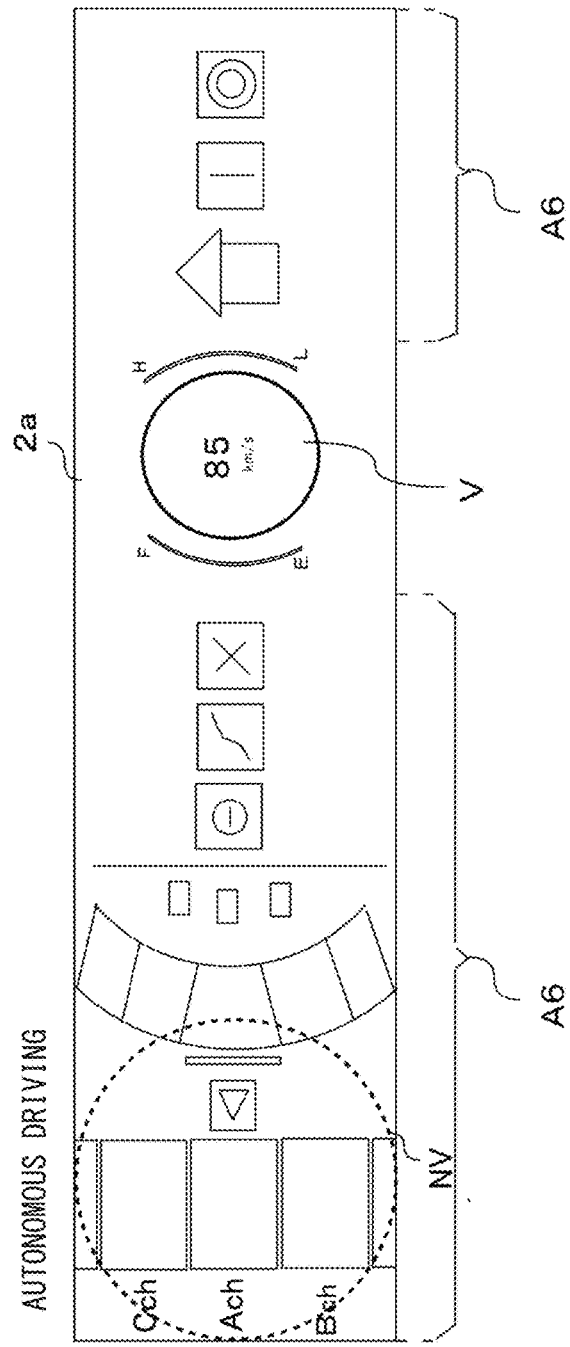

During autonomous driving of level III or higher, as shown in FIG. 13B, the entertainment image content A6 may be displayed on the display 2a to provide information with high distraction and no relation to driving.

The frame rate of the image content displayed in the visual field range NV of the occupant in the front passenger seat may be increased as the level of driving automation increases in order from the level I. As the level of driving automation increases, the driving load required for the driver decreases, and the information that needs to be visually recognized by the driver decreases correspondingly.

In a case where an obstacle, another vehicle such as an automobile or a bicycle, a pedestrian, or the like is recognized around the own vehicle by performing image recognition on the image A5 captured by the periphery camera 23, the display processing unit 13 may control the display 2a to display the image content obtained by image recognition with higher priority. In this case, the specific image content obtained by the image recognition may be displayed with a high frame rate to clearly display the detected object. In this case, the frame rate of specific image content may be increased while reducing other processing loads.

During the autonomous driving of level I or level II, in a case where adaptive cruise control (ACC) for following the preceding vehicle is executed or the traveling lane of the own vehicle is changed, the display processing unit 13 may increase the frame rate of the display 2a for displaying the electronic mirror image A2 or the image captured by rearview camera that photographs rear side of the vehicle. The display screen of display 2a at both left and right ends is shown in FIG. 12. By allocating a large amount of resource to the display processing of image captured by the rearview camera or the electronic mirror image A2, the priority of the processing for displaying the image captured by the rearview camera or the electronic mirror image A2 is set higher than the priority of other processing loads. Then, the frame rate of the image captured by the rearview camera or the electronic mirror image A2 may be maintained or increased while reducing processing loads of other processing.

During autonomous driving mode, the frame rate of central portion of visual field range NV corresponding to the visual line of the driver may be changed. For example, during the autonomous driving of level III or higher, the frame rate of display related to safety system may be lowered by lowering the priority of the display processing of the safety system, and the frame rate of entertainment image content A6 may be increased by increasing the priority of the display processing of entertainment image content A6. In this case, the change of frame rate may be executed after detecting the visual field range NV of the driver and the visual field range of the occupant in the front passenger seat.

In a case where the visual line of the occupant in the front passenger seat and the visual line of the driver are simultaneously detected, the priority order of resource allocation by the ECU 5 for display may be set based on the level of driving automation. The frame rate may be changed in the multiple displays 2a located within the visual field range NV of the driver and the visual field range of the occupant in the front passenger seat.

The frame rate may be changed based on the driving scene. For example, when the vehicle is stopped or in autonomous driving mode, the image content may be changed. When the vehicle is in stopped state, the control of frame rate is not executed. With this configuration, the image can be drawn on the display 2a while improving the user experience.

When the frame rate of each image content is changed due to the above-described reason, the display processing unit 13 may decrease the frame rate slowly, thereby suppressing discomfort feeling to be felt by the occupant. By slowly decreasing frame rate, even though the image quality substantially decreases, discomfort feeling to be felt by the occupant can be suppressed.

When the vehicle travels at a low speed, the change amount of frame rate per unit time, that is changing speed may be lowered in order to suppress discomfort feeling to be felt by the occupant even though the image quality substantially decreases. When the vehicle travels at a high speed, the decreasing speed of frame rate may be increased. When the vehicle speed increases, resource for controlling driving actuators of the vehicle increase accordingly. Thus, decreasing speed of the frame rate may be increased in order to decrease the frame rate as quick as possible, thereby decreasing the processing load.

Second Embodiment

Figure 14:
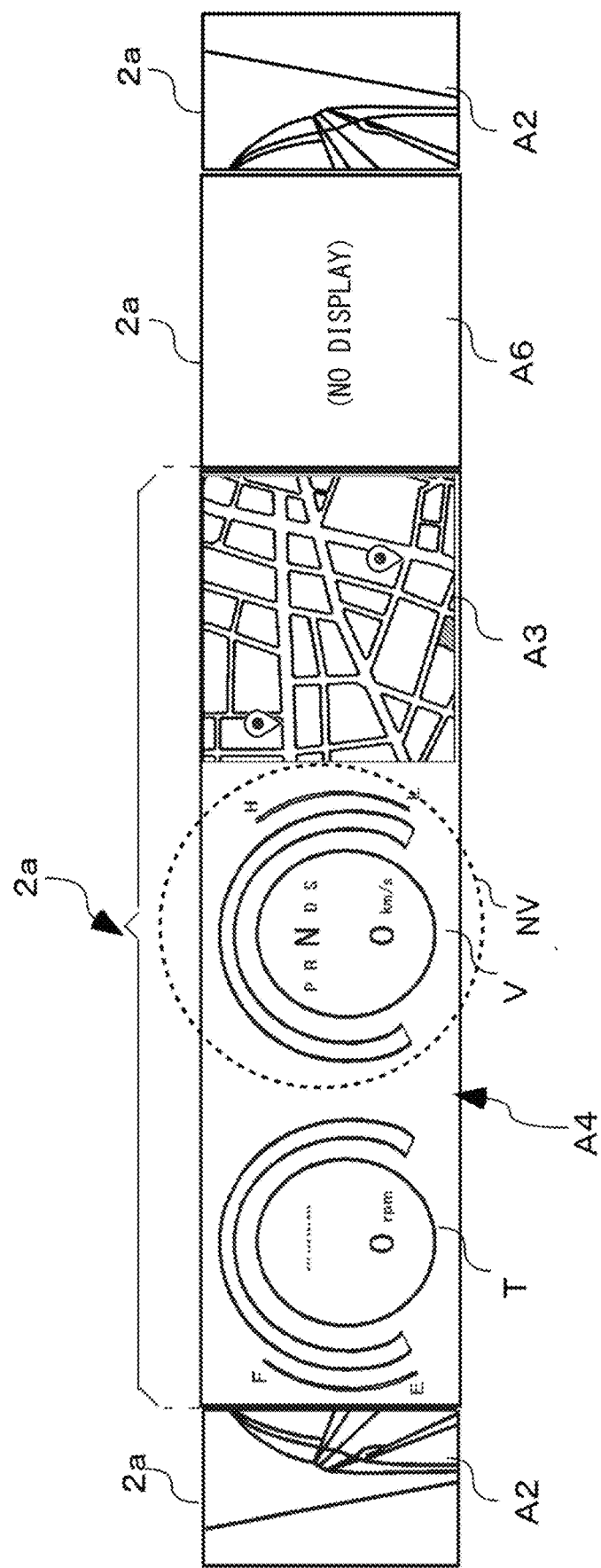
FIG. 14 is a diagram showing a first example of display mode according to a second embodiment.
Figure 15:
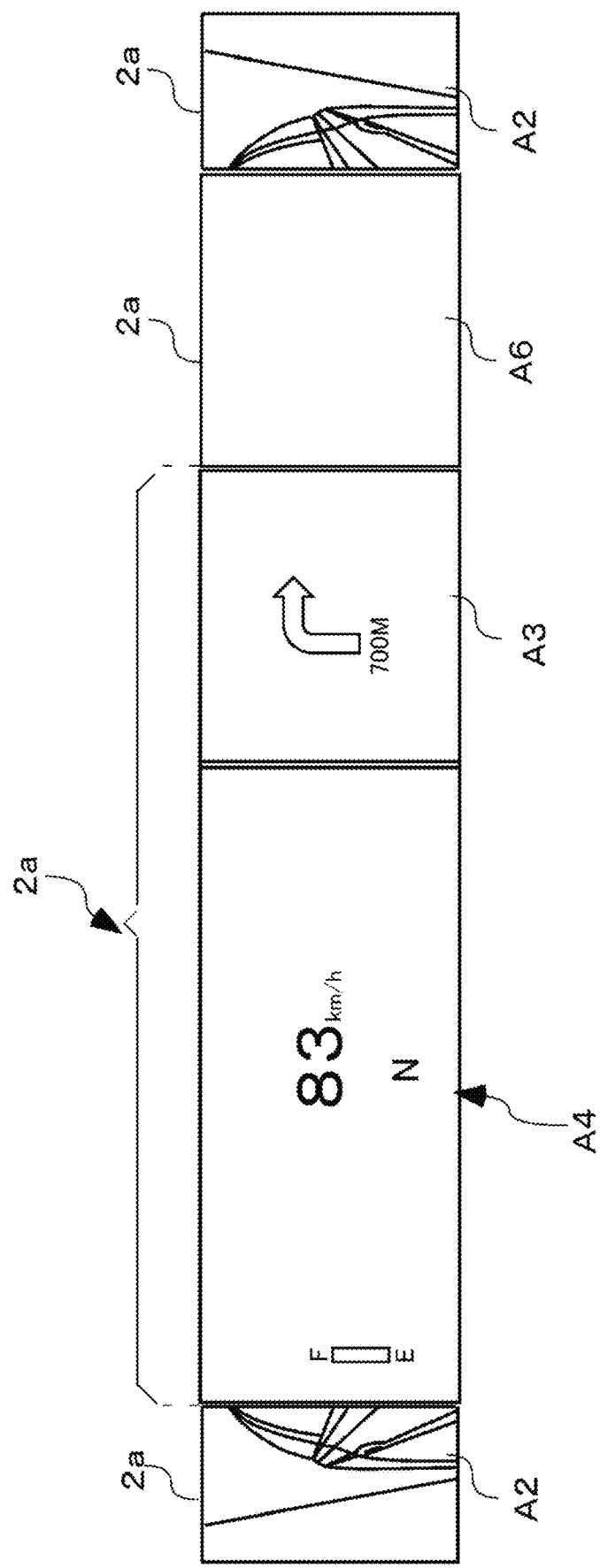
FIG. 15 is a diagram showing a second example of display mode.

The following will describe a second embodiment with reference to FIG. 14 and FIG. 15. In the second embodiment, the processing load changing unit 11d selectively sets a task to reduce the processing load.

The controller 11 can detect an occupant being seated on a front passenger seat or a rear seat by a seat sensor and a seat belt attachment/detachment sensor of the occupant monitor 22. The controller 11 can acquire position information of the portable terminal 27 by establishing short-range wireless communication connection with the portable terminal 27 through the antenna 16a and the wireless communication control unit 16. Then, the controller 11 can detect whether the occupant is in the vehicle by detecting the occupant operation on the portable terminal 27.

The controller 11 can acquire other vehicle information from other ECUs 5 via the communication control unit 7. The vehicle information represents information related to the vehicle, such as vehicle battery information representing a charging state of a battery voltage of vehicle battery for driving an electric system in the vehicle, fuel information representing a remaining amount of gasoline fuel in a case where the vehicle is a gasoline vehicle, and power storage information representing a power storage state of a rechargeable battery for driving the vehicle in a hybrid vehicle or an electric vehicle.

When the operation panel 21 is operated by the occupant to set one of various modes related to driving of the vehicle, the controller 11 receives the set mode. At this time, the controller 11 receives a vehicle mode set by the occupant, for example, a driving mode such as manual driving or autonomous driving, an operation mode of the display device 2, 3, and 4a, or an energy saving mode. Thus, the controller 11 has a function as a vehicle related information acquiring 11e unit that acquires information related to the vehicle.

The processing load changing unit 11d reduces the processing load by controlling the display processing unit 13 to change the display mode of image content based on the acquisition result acquired by the vehicle related information acquiring unit 11e. For example, the processing load may be reduced when the remaining fuel amount becomes smaller than a predetermined amount when the remaining fuel amount is input as the vehicle information. As another example, the processing load may be reduced when the setting operation of the energy saving mode is received from the vehicle occupant.

When at least one or more of predetermined conditions are satisfied, the priority order of allocating resources to the applications 33 for displaying the electronic mirror image A2, the around view A1, or the like may be set to be high, and the priority order of allocating resources to the applications 33 for displaying other contents, for example, other captured image A5 or the entertainment image content A6 may set to be relatively low, thereby selectively hiding certain contents.

The processing load changing unit 11d may reduce the processing load by changing the display mode of the image content when the display processing unit 13 displays the image content in separated display areas. When the display processing unit 13 controls the image contents to be separately displayed on the display areas, if no occupant is seated on the front passenger seat P, the processing load changing unit 11d may reduce the processing load by not displaying the image content in the display area arranged facing the P seat.

As shown in FIG. 12, suppose that the entertainment image content A6, such as a static image or a moving image is normally displayed toward the front passenger seat P. In this case, when it is determined that no occupant is on the front passenger seat P, the display processing unit 13 may delete the display of the entertainment image content A6 on the display 2a arranged facing the front passenger seat P as shown in FIG. 14. Thus, the processing load on the display 2a arranged to face the front passenger seat P can be reduced.

When the processing load is reduced by the processing load changing unit 11d, the display processing unit 13 may change the display mode to a simple design and perform the display processing. At this time, the display may be performed by a display content having a relatively low processing load. For example, regarding the meter image A4, the processing load can be reduced by performing 7-segment digital display without performing graphic display using the needle. As another example, the processing load can be reduced by performing simple digital text display as shown in FIG. 15 without performing graphic display that uses great amount of decorations.

The display processing unit 13 may display content of map image A3 around the current position on the display 2a by reducing the number of colors or by reducing the luminance. As shown in FIG. 15, for the content of the map image A3, the display process may be performed by simplifying or omitting the map itself around the vehicle current position. For example, only the distance information may be displayed together with an arrow mark indicating the traveling direction such as a right turn, left turn, or straight traveling of the vehicle. At this time, the arrow mark and the distance information are not limited to graphic display and may be expressed by character codes. Thus, the processing load can be further reduced.

If necessary, the content may be displayed by lowering the overall luminance of the P to P display device 2, or the content may be displayed by partially lowering the luminance of some of the displays 2a, for example, to the minimum. In some displays 2a, the images may be displayed by reducing the total number of pixels to be smaller than the frame size of display 2a without maximally displaying the full frame size of display. The display processing may be performed by reducing the number of pixels while maintaining the frame size.

When it is determined that the display duration of each content A1 to A6 until execution of display mode switch is shorter than a predetermined duration, the controller 11 intentionally stops the display switching in order to avoid frequent troublesome display switch, such as flickering. For example, when the number of times of display switching is increased by frequent switching the display in order to adjust the number of pixels, the processing load is rather increased. When the controller 11 stops switching the display, the number of display switching times can be reduced, thereby reducing the processing load.

At this time, the controller 11 may increase the priority order of allocating resource to the application 33 that displays the electronic mirror image A2 or the around view A1 so that the display processing unit 13 performs these display processing at all times, and selects and executes switching or stopping of display of other content, for example, other captured image A5 or the entertainment image content A6.

OTHER EMBODIMENTS

The present disclosure is not limited to the embodiments described above, but can be implemented by various modifications, and can be applied to various embodiments without departing from the spirit of the present disclosure.

The display processing unit 13 may perform display processing as follows. Even when an image content is outside the visual field range NV, the frame rate of image content, which is outside the visual field range but related to the image content within the visual field range NV, may be maintained or may be increased and displayed based on the information of driving operation made by the driver of the vehicle.

For example, when the shift position is set to the reverse position, the driver may alternately check the left and right electronic mirror images A2, the image content of the around view A1, or the like. As described above, in response to detecting that the shift position is set to the reverse position, the frame rate may be maintained or increased even though a display content is outside the visual field range NV. Specifically, in response to detecting that the shift position is set to the reverse position, the left and right electronic mirror images A2 and the image content of the around view A1, which are assumed to be relatively highly related to the driving behavior of the driver, are displayed with frame rate being maintained or increased even though the display content is outside the visual field range NV. At this time, the resources may be allocated so that the processing load of image content that is relatively less relevant to the driving behavior of the driver is relatively low.

Figure 16:
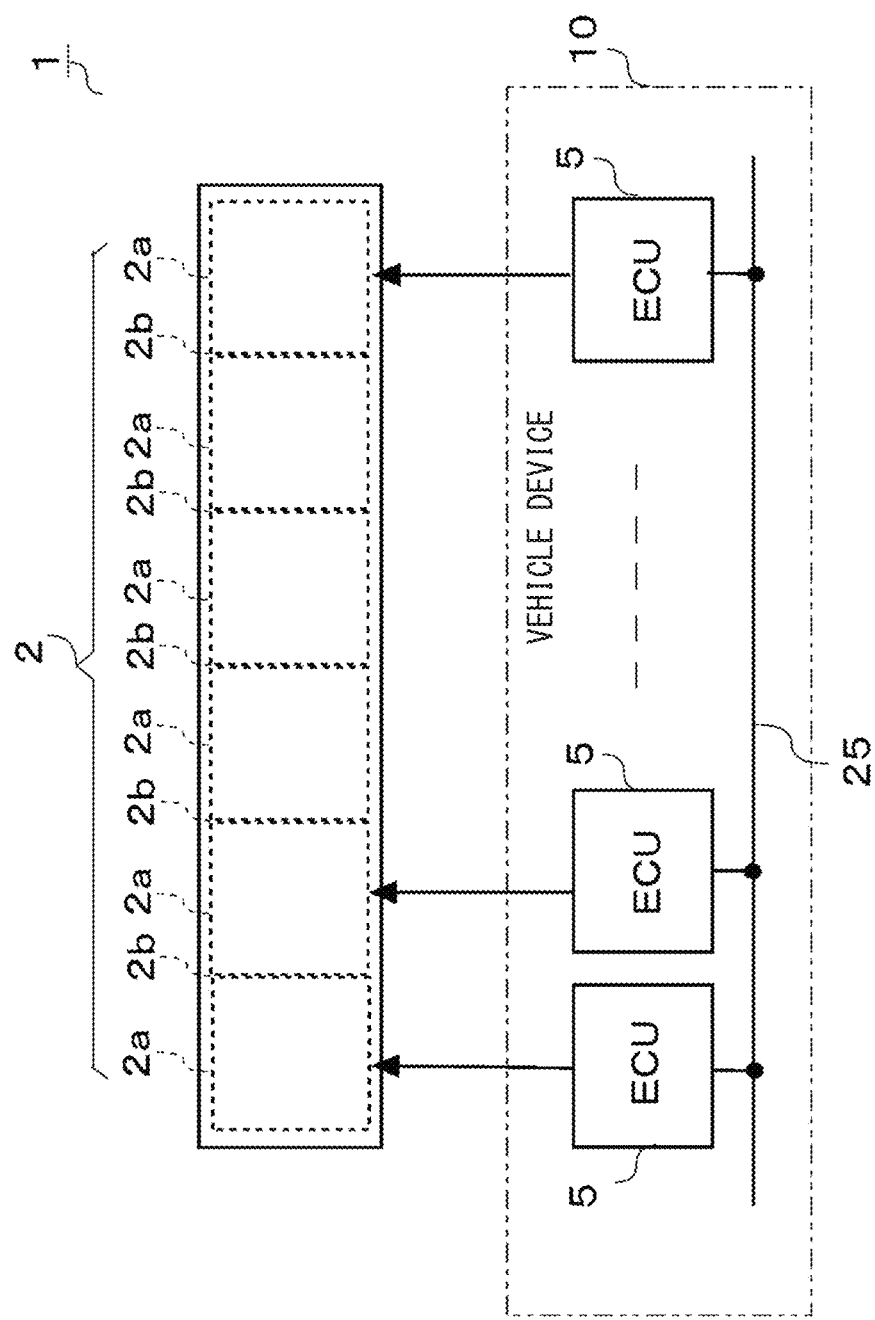
FIG. 16 is a diagram showing a control mode executed by an ECU according to a modification.

In the above-described embodiment, a mode in which the display system ECU 5 shares internal resources and draws and displays image content on the display 2a, 3, and 4a has been described, but the present disclosure is not limited thereto. For example, when displaying the image content on the P to P display device 2, as shown in FIG. 16, multiple ECUs 5 may perform display processing on the corresponding displays 2a. When the display system ECU 5 is configured by multiple ECUs 5, the multiple ECUs 5 may be connected to one other via the in-vehicle network 25 or may be connected to each other via a dedicated communication line.

In the drawings, 11*b* indicates the visual line detecting unit, 11*c* indicates the reference determining unit, 11*d* indicates processing load changing unit, and 13 indicates the display processing unit.

The controller 11, the display processing unit 13, and methods executed by these components described in the present disclosure may be implemented by a dedicated computer including a memory and a processor programmed to execute one or more functions implemented by a computer program. Alternatively, the controller 11, the display processing unit 13, and methods executed by these components described in the present disclosure may be implemented by a dedicated computer including a processor configured by one or more dedicated hardware logic circuits. Alternatively, the controller 11, the display processing unit 13, and methods executed by these components described in the present disclosure may be implemented by using one or more dedicated computers including a combination of (i) the memory and the processor programmed to execute one or more functions, and (ii) the processor configured by one or more hardware logic circuits. The computer program may be stored, as instructions to be executed by a computer, in a computer-readable non-transitory tangible storage medium.

The present disclosure has been described in accordance with the embodiments. However, it is to be understood that the present disclosure is not limited to the embodiments and configurations described above. The present disclosure includes various modification examples and equivalents thereof. In addition, various combinations and configurations, as well as other combinations and configurations that include only one element, more, or less, are within the scope and spirit of the present disclosure.

What is claimed is:

1. A vehicle display system comprising:
   a display processing unit, comprising a computer, displaying multiple image contents in separate display areas of a display device arranged in a vehicle;
   a visual field detecting unit, comprising a computer, detecting a visual field range of an occupant of the vehicle;
   a reference determining unit, comprising the computer, determining whether a frame rate of a certain image content displayed in the visual field range satisfies a lowest reference, the certain image content being one of the multiple image contents; and
   a processing load changing unit, comprising the computer, in response to determining that the frame rate of the certain image content does not satisfy the lowest reference, reducing a processing load of a different process while maintaining a display process of the certain image content in the visual field range of the occupant,
   wherein the processing load changing unit reduces the processing load by lowering a frame rate of another one of the multiple image contents displayed outside the visual field range of the occupant.

2. The vehicle display system according to claim 1, wherein
   the processing load changing unit displays one of the multiple image contents required to be displayed to a driver of the vehicle by maintaining a frame rate to be equal to or higher than the lowest reference with a higher priority than the remaining image content, and the processing load changing unit reduces the processing load by lowering a frame rate of the remaining image content that is not required to be displayed to the driver of the vehicle.

3. The vehicle display system according to claim 1, wherein
   the processing load changing unit displays one of the multiple image contents required to be displayed to a driver of the vehicle by increasing a frame rate with a higher priority than the remaining image content, and the processing load changing unit reduces the processing load by lowering or maintaining a frame rate of the remaining image content that is not required to be displayed to the driver of the vehicle.

4. The vehicle display system according to claim 1, wherein
   the processing load changing unit determines a priority order of displaying the multiple image contents based on information of a driving operation performed by a driver of the vehicle, and
   the processing load changing unit reduces the processing load by lowering a frame rate of one of the multiple image contents having a lower priority order.

5. The vehicle display system according to claim 1, wherein
   the processing load changing unit determines a priority order of displaying the multiple image contents based on information related to an operation made by the occupant of the vehicle on an accessory device of the vehicle, and
   the processing load changing unit reduces the processing load by lowering a frame rate of one of the multiple image contents having a lower priority order.

6. The vehicle display system according to claim 1, wherein
   the processing load changing unit reduces the processing load by changing the frame rate of the certain image content displayed in the visual field range of the occupant corresponding to a level of driving automation at which an autonomous driving of the vehicle being executed.

7. The vehicle display system according to claim 1, wherein
   the processing load changing unit reduces the processing load by (i) decreasing a display range outside the visual field range, (ii) decreasing a resolution, (ill) decreasing a number of colors, or (iv) decreasing a gradation.

8. The vehicle display system according to claim 1, wherein
   the processing load changing unit reduces the processing load by changing a display mode of one of the multiple image contents, which is required to be displayed to a driver of the vehicle.

9. The vehicle display system according to claim 1, wherein
   the display device displays the multiple image contents in one display area of the display device corresponding to requests from multiple applications,
   the processing load changing unit sets a priority order for each of the multiple applications regarding an increase of frame rate and changes the frame rate of each of the multiple image contents, which correspond to the multiple applications, according to the set priority order, and
   the processing load changing unit reduces the processing load by decreasing the frame rate of one of the multiple applications which has a low priority order.

10. The vehicle display system according to claim 1, wherein
the processing load changing unit determines a stay duration of a visual line of the occupant in the visual field range detected by the visual field detecting unit and sets a priority order for setting a frame rate based on the stay duration of the visual line, and the processing load changing unit reduces the processing load by changing the frame rate corresponding to the set priority order.

11. The vehicle display system according to claim 1, wherein
the processing load changing unit reduces a processing load of an audio processing while maintaining a resource of display processing that displays the multiple image contents.

12. The vehicle display system according to claim 1, wherein
the processing load changing unit reduces the processing load by changing a frame rate of one of the multiple image contents, which indicates a periphery situation of the vehicle, corresponding to the periphery situation of the vehicle.

13. The vehicle display system according to claim 1, wherein
when the processing load changing unit reduces the processing load, the processing load changing unit gradually reduces a frame rate of one of the multiple image contents.

14. A vehicle display method comprising:
displaying multiple image contents in separate display areas of a display device arranged in a vehicle;
detecting a visual field range of an occupant of the vehicle;
determining whether a frame rate of a certain image content displayed in the visual field range satisfies a lowest reference, the certain image content being one of the multiple image contents; and
in response to determining that the frame rate of the certain image content does not satisfy the lowest reference, reducing a processing load of a different process while maintaining a display process of the certain image content in the visual field range of the occupant,
wherein the processing load changing unit reduces the processing load by lowering a frame rate of another one of the multiple image contents displayed outside the visual field range of the occupant.

15. A computer-readable non-transitory storage medium storing a vehicle display program, the vehicle display program comprising instructions to be executed by a computer and the instructions comprising:
displaying multiple image contents in separate display areas of a display device arranged in a vehicle;
detecting a visual field range of an occupant of the vehicle;
determining whether a frame rate of a certain image content displayed in the visual field range satisfies a lowest reference, the certain image content being one of the multiple image contents; and
in response to determining that the frame rate of the certain image content does not satisfy the lowest reference, reducing a processing load of a different process while maintaining a display process of the certain image content in the visual field range of the occupant,
wherein the processing load changing unit reduces the processing load by lowering a frame rate of another one of the multiple image contents displayed outside the visual field range of the occupant.

* * * * *